United States Patent [19]

Okada et al.

[11] Patent Number: 5,534,828
[45] Date of Patent: Jul. 9, 1996

[54] DIGITIZED QUADRATURE MODULATOR

[75] Inventors: Takashi Okada, Kanagawa; Tadashi Shirato, Tokyo, both of Japan

[73] Assignee: Nippon Telegraph and Telephone Corporation, Tokyo, Japan

[21] Appl. No.: 503,478

[22] Filed: Jul. 18, 1995

[30] Foreign Application Priority Data

| Jul. 20, 1994 | [JP] | Japan | 6-168280 |
| Aug. 5, 1994 | [JP] | Japan | 6-203032 |
| Aug. 5, 1994 | [JP] | Japan | 6-203033 |
| Aug. 8, 1994 | [JP] | Japan | 6-204179 |

[51] Int. Cl.$^6$ .............................. H03C 1/00; H03C 3/00; H04L 27/20
[52] U.S. Cl. ............................ 332/103; 332/144; 332/149; 375/298; 375/308
[58] Field of Search ..................... 332/103–105, 332/144, 145, 149, 151; 375/261, 268, 269, 279, 298, 300, 308

[56] References Cited

U.S. PATENT DOCUMENTS

| 4,644,565 | 2/1987 | Seo et al. | 375/298 X |
| 5,459,749 | 10/1995 | Park | 332/149 X |

FOREIGN PATENT DOCUMENTS 6-69969  3/1994  Japan .

OTHER PUBLICATIONS

"A VLSI Architecture for a High–Speed All–Digital Quadrature Modulator and Demodulator for Digital Radio Applications", Samueli et al, *IEEE Journal on Selected Areas in Communications*, vol. 8, No. 8, Oct. 1990, pp. 1512–1519.

"QPSK Modulator with Digital Signal Wave from Synthesis", Kikuchi et al, *Proceedings of Japanese Electron. Commun. Conference*, 2297, 1986, pp., 10–30.

"A Multipurpose Modulator ASIC for Digital Communication", Okada et al., *Proceedings of Japanese Electron. Inf. Commun. Conference*, B–401, 1994; p. 401.

*Primary Examiner*—David Mis
*Attorney, Agent, or Firm*—Nikaido, Marmelstein, Murray & Oram

[57] ABSTRACT

A digitized quadrature modulator receives an I-channel input digital signal and Q-channel input digital signal, and quadrature modulater the I-channel and Q-channel input digital signals by digital signal processing. The modulator has a digital filter (504) for shaping the spectrum of the I-channel and Q-channel input digital signals to provide I-channel and Q-channel output signals. The output signals have a predetermined phase shift between the I-channel and the Q-channel so as to compensate a phase difference based upon the quadrature modulation by the digital signal processing. Complementers (505a, 505b) for taking the complement of the I-channel and Q-channel output signals to provide I-channel and Q-channel complement signals. A multiplexer (505c) multiplexer the I-channel and Q-channel output signals from the digital filter and the I-channel and Q-channel complement signals from the complementers to provide a quadrature modulated output signal.

13 Claims, 24 Drawing Sheets

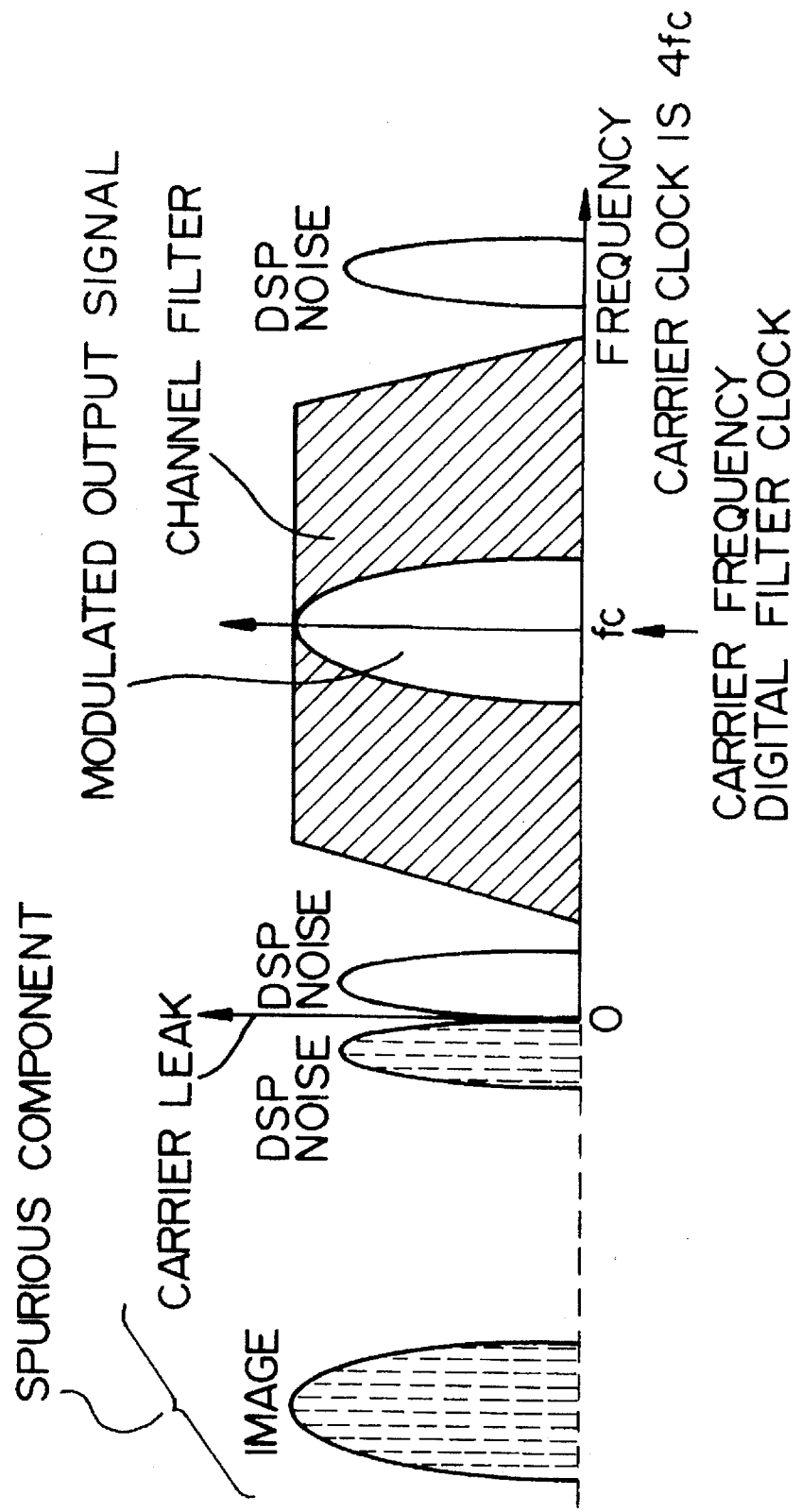

Fig. 21

| INPUT SIGNAL | | $D_{10}, D_{20}, D_{30}, D_{40}$ | | $D_{11}, D_{21}, D_{31}, D_{41}$ | |
|---|---|---|---|---|---|
| ROM ADDRESS | $D_{10}$ | $D_{20}$ | $D_{30}$ | $D_{40}$ | $D_{11}$ | $D_{21}$ | $D_{31}$ | $D_{41}$ |
| INPUT OF ACCUMULATOR | | | | | | | | |
| (4 INPUT) | $D_{10}$ | $D_{20}$ | $D_{30}$ | $D_{40}$ | $D_{11}$ | $D_{21}$ | $D_{31}$ | $D_{41}$ |
| (3 INPUT) | $D_{10}$ | $D_{20}$ | $D_{30}$ | 0 | $D_{11}$ | $D_{21}$ | $D_{31}$ | 0 |
| (2 INPUT) | $D_{10}$ | $D_{20}$ | 0 | 0 | $D_{11}$ | $D_{21}$ | 0 | 0 |
| (1 INPUT) | $D_{10}$ | 0 | 0 | 0 | $D_{11}$ | 0 | 0 | 0 |
| OUTPUT OF ACCUMULATOR | | $D_{10} + D_{20}/2 + D_{30}/4 + D_{40}/8$ | | | $D_{11} + D_{21}/2 + D_{31}/4 + D_{41}/8$ | | | |

DIGITIZED QUADRATURE MODULATOR

FIELD OF THE INVENTION

The present invention relates to a digitized quadrature modulator for implementing phase modulation, amplitude modulation and quadrature amplitude modulation of digital signals.

DESCRIPTION OF THE RELATED ART

Recently, demands for high speed digital transmission such as image communication and high bit-rate data transmission have been increased. To accommodate the increasing demands for high speed digital transmission, it has been desired to realize advanced access radio transmission architectures for connecting users with networks by means of radio transmission lines. As one of the advanced access radio transmission architectures, there is an adaptive modulation system which can change modulation scheme and transmission bandwidth depending upon the amount of traffic, upon the state of the transmission lines and also upon requests of the users. This adaptive modulation system will be effective for frequency utilization efficiency and for absorbing possible traffic variations.

In order to implement the adaptive modulation system, it is necessary to provide a modulator capable of variably controlling both its modulation scheme and its transmission bandwidth. Unfortunately, existing analog modulators cannot carry out such functions. Also, there is no digital processing quadrature modulator capable of variably controlling its modulation scheme and its transmission bandwidth.

Hereinafter, constitution of the conventional digitized quadrature modulators will be described.

FIG. 1 is a block diagram illustrating a typical constitution of a conventional digitized quadrature modulator. This modulator is constituted by replacing analog processing elements of an analog quadrature modulator with digital processing elements, respectively.

In the figure, reference numeral 100 denotes an in-phase channel (I-channel) signal input terminal, 101 a quadrature channel (Q-channel) signal input terminal, 102 an I-channel digital filter, 103 a Q-channel digital filter, 104 and 105 digital multipliers, 106 a digital adder, 107 a clock input terminal, 108 a counter, 109 a waveform generation ROM for producing carrier signals, 110 a digital-to-analog (D/A) converter, 111 a band pass filter (BPF), 112 a mixer, 113 a BPF, 114 an IF modulated signal output terminal and 115 a local oscillator, respectively.

In this conventional modulator, quadrature carrier signals are produced by the counter 108 and the ROM 109. The digital filters 102 and 103 receive input digital signals on n-sequence(s) (n is an integer equal to or greater than one) of I-channel and of Q-channel, respectively, to execute spectrum shaping and band limitation of these received signals. A baseband quadrature modulated output signal is provided by multiplying outputs from these digital filter 102 and 103 with the quadrature carrier signals at the multipliers 104 and 105, respectively, by adding outputs of the multipliers 104 and 105 at the adder 106, and thereafter by converting an output of the adder 106 into an analog signal at the D/A converter 110. FIG. 4a shows a timing chart of these signals in the conventional quadrature modulator.

An another conventional digitized quadrature modulator having a more simple constitution to decrease calculation amount of DSP (Digital Signal Processing) is described in H. Samuelli and B. C. Wong, "A VLSI Architecture for a High-Speed All-Digital Quadrature Modulator and Demodulator for Digital Radio Applications", IEEE J. Select. Areas Commun., Vol. 8, No. 8, pp. 1512–1519, October 1990, and illustrated as a block diagram shown in FIG. 2.

In FIG. 2, reference numeral 200 denotes an in-phase channel (I-channel) signal input terminal, 201 a quadrature channel (Q-channel) signal input terminal, 202 and 203 flip-flops for sampling input signals of respective channels, and 205 a digital filter. The digital filter 205 is constituted by a digital filtering portion for 0 phase $205_0$, a digital filtering portion for $\pi/2$ phase $205_1$, a digital filtering portion for $\pi$ phase $205_2$ and a digital filtering portion for $3\pi/2$ phase $205_3$. In FIG. 2, furthermore, reference numeral 206 denotes a four input multiplexer (4-to-1 selector), 207 a clock input terminal, 208 a ¼ frequency divider, 209 a digital-to-analog (D/A) converter, 210 a band pass filter (BPF), 211 a mixer, 212 a BPF, 213 an IF modulated signal output terminal and 214 a local oscillator, respectively.

This conventional modulator realizes quadrature modulation by using the fact that the amplitudes of each of the quadrature carrier signals sampled at 0 phase, $\pi/2$ phase, $\pi$ phase and $3\pi/2$ phase become as follows:

I-channel (COS): 1 0 −1 0

Q-channel (SIN): 0 1 0 −1

Namely, the filtering portions $205_0$ to $205_3$ divided into the respective phases conduct the above calculation with the input signals of each channel, and the multiplexer 206 sequentially selects the calculated outputs from the filtering portions.

Further conventional digitized quadrature modulator described in Japanese unexamined publication No. 6(1994)-69969 is shown in FIG. 3.

In FIG. 3, reference numeral 300 denotes an in-phase channel (I-channel) signal input terminal, 301 a quadrature channel (Q-channel) signal input terminal, 302 and 303 flip-flops for sampling input signals of respective channels, 304 an I-channel digital filter, 305 a Q-channel digital filter and 306 a quadrature modulation circuit. The modulation circuit 306 is constituted by a two input multiplexer (2-to-1 selector) 306a, a bit inverter 306b and a two input multiplexer (2-to-1 selector) 306c. In FIG. 3, furthermore, reference numeral 307 denotes a clock input terminal, 308 a ¼ frequency divider, 309 a digital-to-analog (D/A) converter, 310 a band pass filter (BPF), 311 a mixer, 312 a BPF, 313 an IF modulated signal output terminal and 314 a local oscillator, respectively.

This conventional modulator realizes quadrature modulation by using also the fact that the amplitudes of each of the quadrature carrier signals sampled at 0 phase, $\pi/2$ phase, $\pi$ phase and $3\pi/2$ phase become 1, 0, −1, 0 and 0, 1, 0, −1 as described above. Namely, outputs from the I-channel and Q-channel digital filters 304 and 305 are sequentially multiplexed by the multiplexer 306a, and then non-inverting and inverting paths of the multiplexed output are switched by means of the bit inverter 306b and the multiplexer 306c.

In general, a DSP quadrature modulator cannot directly produce a modulated output signal at a radio frequency. Therefore, the baseband quadrature modulated output signal is first D/A converted and then the analog modulated output signal is up-converted into a desired frequency (IF or RF). In order to eliminate folding noises (DSP noises) which may be produced during the DSP and harmonic spurious components which may be produced during the frequency conversion, it is necessary to provide analog BPF(s).

However, in designing the conventional digitized quadrature modulator, an appended analog signal processing circuit such as analog BPF(s) has not been taken into consideration. As a result, although the conventional DSP quadrature modulator can improve its modulation accuracy by the DSP, design of a necessary analog circuit for eliminating spurious components such as DSP noises and harmonic components is extremely difficult.

FIG. 4b illustrates frequency arrangement of an output from the D/A converter in the conventional digitized quadrature modulator. As shown in this figure, a folding noise caused by the DSP (DSP noise) and spurious components such as carrier leak and image caused by the frequency conversion appear near the IF modulated output signal. Thus, the design of the analog filter which must eliminate only these unnecessary spurious components without deteriorating transmission characteristics of the modulator, becomes very difficult.

SUMMARY OF THE INVENTION

It is therefore an object of the present invention to provide a digitized quadrature modulator which can solve the above-mentioned problem of the conventional architecture, namely to provide a digitized quadrature modulator whereby its analog signal processing circuit can be easily designed.

Another object of the present invention is to provide a digitized quadrature modulator which can variably control its modulation scheme and its transmission bandwidth.

A further object of the present invention is to provide a digitized quadrature modulator whereby its circuit structure can be simplified without requesting an additional complicated control for its digital filter.

A still further object of the present invention is to provide a digitized quadrature modulator whereby, in response to different baud rates of input signals, modulated output signals can be produced without varying specifications of its analog signal processing circuit.

The present invention relates to a digitized quadrature modulator for receiving n-sequence(s) (n is an integer equal to or greater than one) of I-channel input digital signal and n-sequence(s) of Q-channel input digital signal, and for quadrature modulating the I-channel and Q-channel input digital signals by a DSP.

Particularly, the modulator according to the present invention includes a digital filter for shaping the spectrum of the I-channel and Q-channel input digital signals to provide I-channel and Q-channel output signals, the output signals having a predetermined phase shift between the I-channel and the Q-channel so as to compensate a phase difference based upon the quadrature modulation by the DSP, complementary circuits for taking the complement of the I-channel and Q-channel output signals to provide I-channel and Q-channel complement signals, and a multiplexer circuit for multiplexing the I-channel and Q-channel output signals from the digital filter and the I-channel and Q-channel complement signals from the complementary circuits to provide a quadrature modulated output signal.

Since the digital filter of the present invention is designed to provide a phase shift of $(P_I-P_Q)$ between both channels, which corresponds to the timing phase difference of $P_{dif}$ between both channels due to the DSP quadrature modulation, several cycles of carrier signals can be multiplied with an output of the digital filter without deteriorating transmission characteristics caused by the above-mentioned phase difference between the channels. Accordingly, the carrier frequency (the center frequency of the modulated output signal) can be optionally selected to a desired value without considering the operation conditions of the digital filter.

Also, since the modulating part is constituted by the high-speed circuit such as the complementary circuits and the multiplexer circuit, it is very easy to raise the carrier frequency. If the carrier frequency is raised, folding noises (DSP noises) caused by the DSP and spurious components such as carrier leak and image caused by the frequency conversion will be produced at frequencies far from that of the modulated output signal. As a result, these DSP noise and spurious components can be sufficiently eliminated by an analog BPF having a relative wide bandpass width so as to not deteriorate transmission characteristics of the modulator. This causes the design of the analog signal processing circuit to become very easy.

In an embodiment of the present invention, the digital filter includes an address generation circuit for multiplexing the input digital signals to generate an address signal, an waveform memory for storing waveform data having a predetermined phase shift between the I-channel and the Q-channel so as to compensate the phase difference caused by the quadrature modulation, and for outputting respective waveform data corresponding to a plurality of phases in response to the address signal, a plurality of weighting accumulators for weighting the respective waveform data from the memory to provide weighted data, and an adder for adding the weighted data.

It is preferred that the complementary circuits consist of a first complementer for taking the complement of the I-channel output signal to provide an I-channel complement signal and a second complementer for taking the complement of the Q-channel output signal to provide a Q-channel complement signal, and that the multiplexer circuit consists of a selector for sequentially multiplexing the I-channel output signal, the Q-channel channel output signal, the I-channel complement signal, and the Q-channel complement signal In this order to provide a quadrature modulated output signal.

The digital filter may be constituted so that a phase of only the I-channel input digital signal or the Q-channel input digital signal is shifted by an amount of the phase difference based upon the quadrature modulation, or so that phases of the I-channel and Q-channel input digital signals are equally shifted in the opposite direction from each other by a half amount of the phase difference based upon the quadrature modulation.

The digital filter may be also constituted so that phases of the I-channel and Q-channel input digital signals are equally shifted in the opposite direction from each other by a half amount of the phase difference based upon the quadrature modulation, and that the same filtering circuit is utilized for both directions by inverting the time base of the input digital signals.

Since the phase characteristics of the digital filter is designed to be shifted in advance and delay directions by $P_{dif}/2$ and the tap coefficients for both channels are used by inverting their time base, the filter circuit can be utilized in a time sharing manner without using a complicated additional circuit causing the circuit structure to be simplified. The frequency of a clock used in the digital filter will not be higher than that of the modulation clock even if the filter circuit is commonly used in the time sharing manner because the original clock frequency in the digital filter is less than a half of the modulation clock frequency.

In an embodiment of the present invention, the digital filter includes a waveform memory for storing amplitude information having a predetermined phase shift between the I-channel and the Q-channel so as to compensate the phase difference based upon the quadrature modulation.

Preferably, the digital filter is constituted so that the number of samples per symbol $M_S$ in the digital filter is varied depending upon a baud rate control signal applied thereto. In this case, the digital filter may include a waveform memory having a plurality of ROMs for storing respective waveform data corresponding to a plurality of phases and the ROMs of a number which corresponds to the number of samples per symbol $M_S$ may be enabled to operate.

Also, the digital filter may include a plurality of weighting accumulators for weighting the respective waveform data from the ROMs to provide weighted data, and an adder for selecting the weighted data of a number which corresponds to the number of samples per symbol $M_S$ and for shift-adding the selected weighted data.

The variable baud rate control, namely variable transmission bandwidth control, is realized by forming a selection function without changing the operation condition of the digital filter. Therefore, if an analog BPF is designed to fit with the maximum baud rate mode, all the baud rate modes can be covered without changing specifications in the analog signal processing circuit. The conventional art never takes account of adjusting the number of samples per symbol to variably control the baud rate. Namely, according to the conventional art, a new mode is started as soon as a switching signal for changing the baud rate is applied. Therefore, a phase discontinuity will occur at the mode switching point causing unnecessary noises to be produced. Thus, according to the conventional art, the digital filter has to be reset at the mode switching point. Contrary to this, according to the present invention, since the baud rate mode switching is realized by the enable control of ROMs and by the control of a reset value of the counter, phase continuity can be maintained at the mode switching point. Thus, no noise will occur at the switching so that it is not necessary to reset the digital filter at the mode switching point. Furthermore, according to the present invention, the mode switching can be completed in an instant.

In an embodiment of the present invention, the I-channel and Q-channel input digital signals have a plurality of baud rates, and the modulator is constituted so that the number of samples per symbol $M_S$ is varied depending upon the baud rates to provide modulated output signals having the same center frequency with each other.

By implementing the variable baud rate control, modulated output signals can be obtained without changing the circuit constant of the analog signal processing circuit, even when input signals have a plurality of baud rates. In other words, a plurality of DSP quadrature modulated output signals having the same center frequency can be produced by applying a control signal for indicating the baud rate of the input signal to vary the sampling cycle in the digital filter.

A BPF for eliminating DSP noises should be designed so as to eliminate the DSP noises without deteriorating transmission characteristics, with respect to the maximum baud rate input signal among various baud rate input signals. If so designed, since the number of samples per symbol with respect to the other input signals having a lower baud rate is greater than that of the maximum rate signal, the DSP noises will be separated out by the pass band of this BPF. Accordingly, such noises due to the various baud rate input signals can be effectively eliminated by a single BPF.

The number of samples per symbol in the digital filter is varied in accordance with input signals having a plurality of baud rates and a BPF for eliminating DSP noises is designed to fit with the maximum baud rate input signal. Therefore, modulated output signals having the same center frequency can be obtained which results in no need for changing the circuit constant of the analog signal processing circuit, even when input signals have a plurality of baud rates.

It is preferred that the digital filter includes a circuit for selectively clearing the waveform data from the ROMs in response to a modulation scheme control signal applied thereto.

The variable modulation scheme control can be realized by the clearing function with respect to the outputs from the waveform memory without changing the operation condition of the digital filter. Therefore, not only the mode switching of the modulation scheme can be completed in a moment, but also an advanced facility can be easily added without changing specifications in the analog signal processing circuit.

Further objects and advantages of the present invention will be apparent from the following description of the preferred embodiments of the invention as illustrated in the accompanying drawings.

BRIEF DESCRIPTION OF THE DRAWINGS

FIG. 6b illustrates a frequency arrangement of output from the D/A converter in the embodiment of FIG. 5;

FIG. 21 illustrates a timing chart of signal processing in the digital filter of FIG. 15.

DESCRIPTION OF THE PREFERRED EMBODIMENTS

Figure 5:
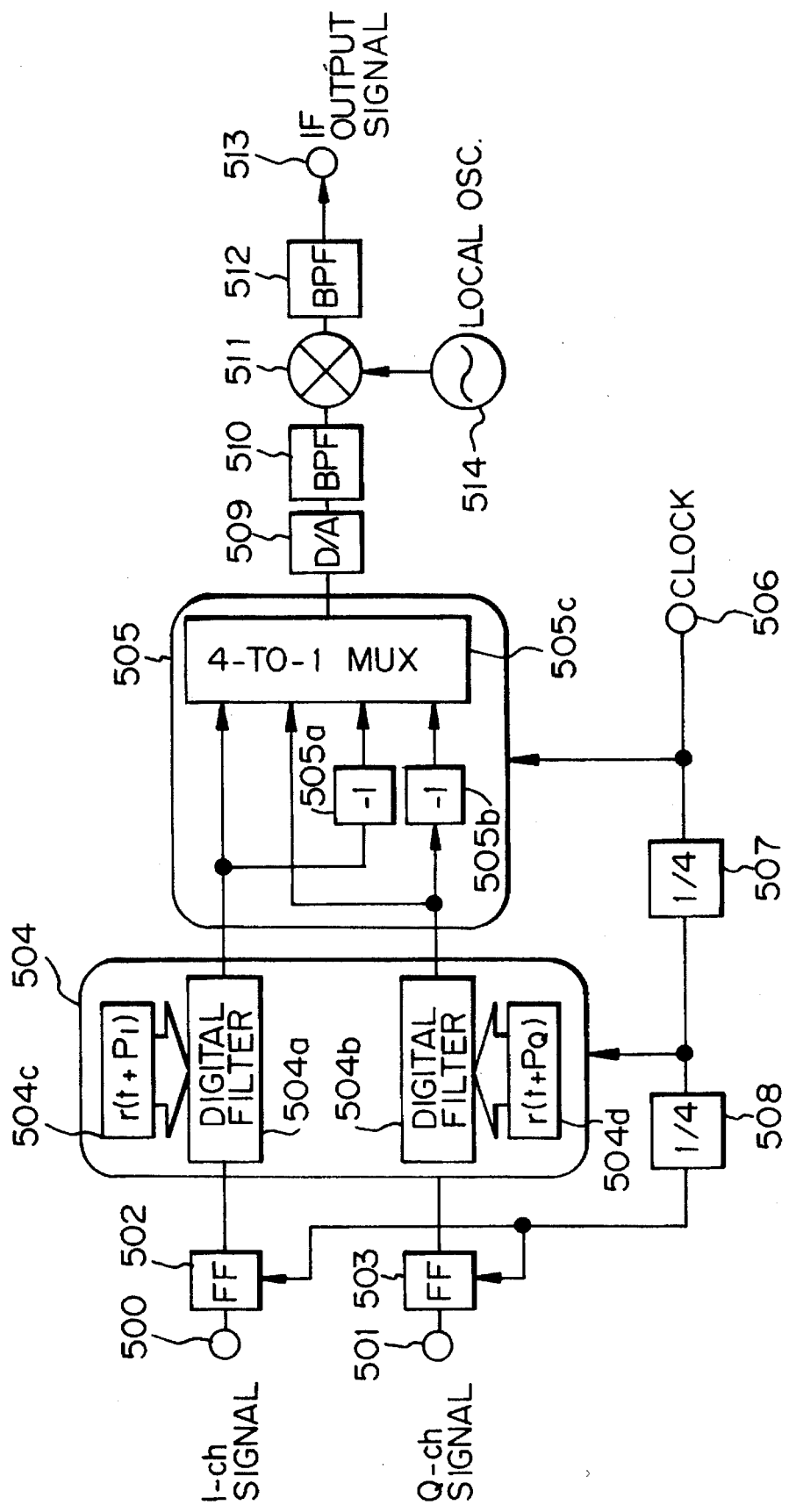
FIG. 5 schematically shows a whole constitution of a preferred embodiment of a digitized quadrature modulator according to the present invention.

FIG. 5 is a block diagram which schematically shows a whole constitution of a preferred embodiment of a digitized quadrature modulator according to the present invention.

In the figure, reference numeral 500 denotes an in-phase channel (I-channel) signal input terminal, 501 a quadrature channel (Q-channel) signal Input terminal, 502 a flip-flop connected to the signal input terminal 500 for sampling I-channel input signal, 503 a flip-flop connected to the signal input terminal 501 for sampling Q-channel input signal, and 504 a digital filter.

The digital filter 504 is constituted, in this embodiment, by an I-channel digital filter portion 504a, a Q-channel digital filter portion 504b, a circuit 504c for providing an impulse response $r(t+P_I)$ with phase shift amount of $P_I$ to the I-channel digital filter portion 504a, and a circuit 504d for providing an impulse response $r(t+P_Q)$ with phase shift amount of $P_Q$ to the Q-channel digital filter portion 504b, where $r(t)$ corresponds a normal impulse response of each the digital filter portions 504a and 504b.

An output terminal of the I-channel filter portion 504a is connected directly to a first input terminal of a four input multiplexer (4-to-1 selector) 505c in a quadrature modulation circuit 505, and also connected to a third input terminal of the multiplexer 505c via a first complementer 505a for taking the complement of its input signal. An output terminal of the Q-channel filter portion 504b is connected directly to a second input terminal of the multiplexer 505c, and also connected to a fourth input terminal of the multiplexer 505c via a second complementer 505b for taking the complement of its input signal.

A clock input terminal 506 is connected to a ¼ clock frequency divider 507 and to a clock input terminal of the multiplexer 505c. An output terminal of the divider 507 is connected to clock input terminals of the digital filter portions 504a and 504b, and also to control terminals of the flip-flops 502 and 503 via a ¼ clock frequency divider 508.

An output terminal of the multiplexer 505c is coupled to an IF modulated signal output terminal 513 via a digital-analog (D/A) converter 509, a bandpass filter (BPF) 510, a mixer 511 and a BPF 512. To the mixer 511, an output terminal of a local oscillator 514 is also connected.

In this quadrature modulator, I-channel and Q-channel input signals are sampled by clocks having ¹⁄₁₆ frequency of the system clock (clock for the modulation), and then the sampled signals are applied to the I-channel and Q-channel filter portions 504a and 504b, respectively. These signals are output, after being spectrum-shaped and bandlimited in the filter portions, to the quadrature modulation circuit 505.

Figure 6A:
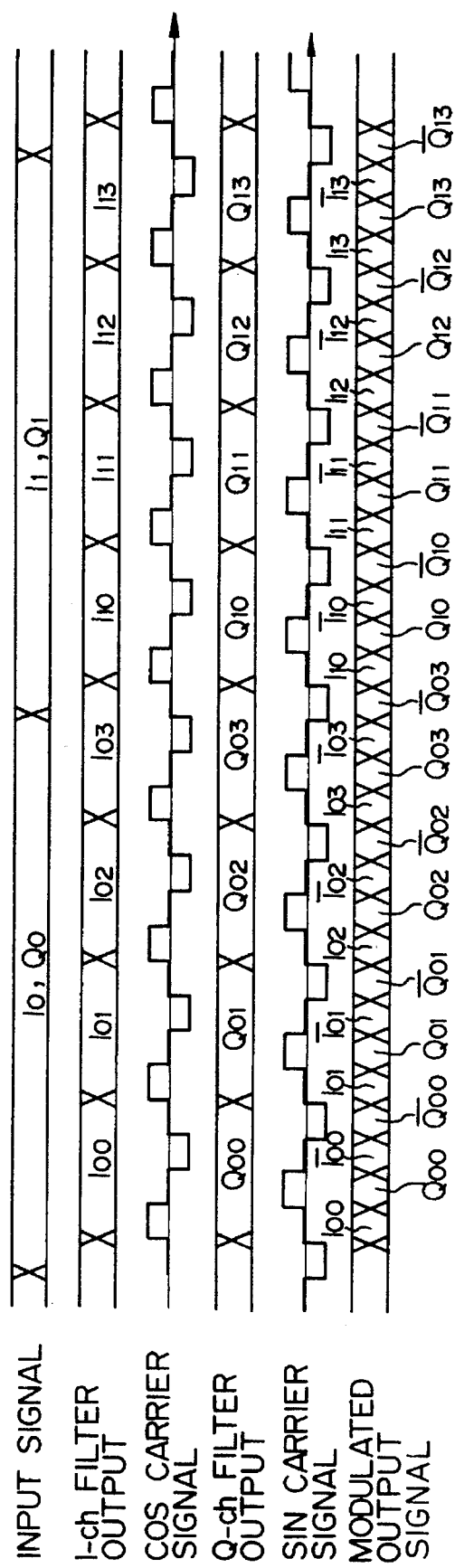
FIG. 6a illustrates a timing chart of signal processing in the embodiment of FIG. 5.

In the circuit 505, the I-channel and Q-channel outputs from the filter 504 and inverted signals of these outputs are multiplexed at a predetermined sequence (i.e. first, output (I) from the I-channel filter 504a, then, output (Q) from the Q-channel filter 504b, then, output ($\bar{I}$) from the first complementer 505a, and lastly, output ($\bar{Q}$) from the second complementer 505b) at every time slot of the output, by means of the multiplexer 505c, and thus, a baseband quadrature modulated output signal, as shown in FIG. 6a, is provided.

Since the modulation circuit 505 is constituted by the high-speed circuit such as the complementers and the selector, it is very easy to raise the carrier frequency (center frequency of an IF modulated output signal). If the carrier frequency is raised, as shown in FIG. 6b, folding noises (DSP noises) caused by the DSP and spurious components such as carrier leak and image caused by the frequency conversion will be produced at frequencies far from that of the IF modulated output signal (carrier frequency). As a result, these DSP noise and spurious components can be sufficiently eliminated by an analog BPF having a relative wide bandpass width so as to not deteriorate transmission characteristics of the modulator. This causes the design of the analog signal processing components to become very easy.

Figure 1:
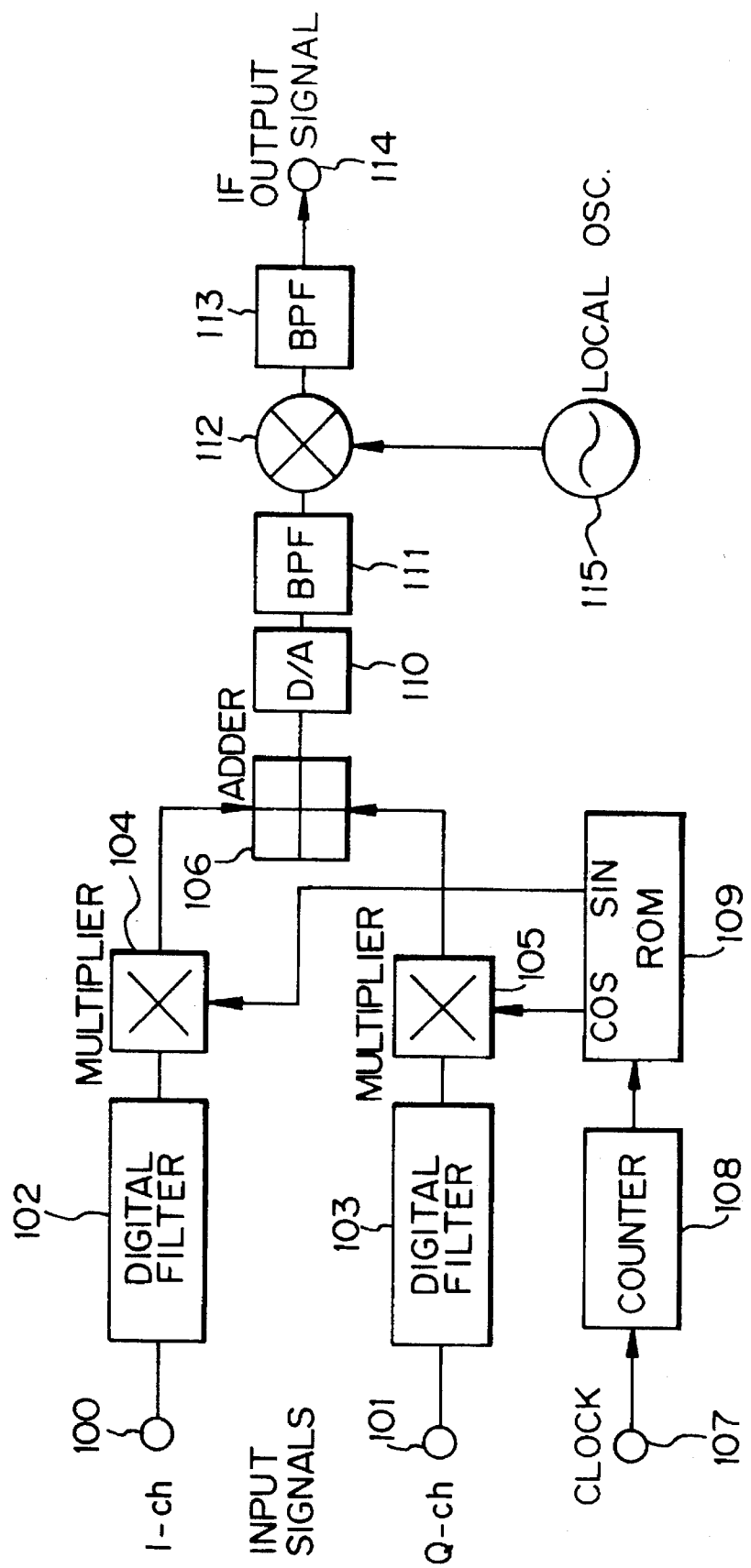
FIG. 1 shows the already described typical constitution of the conventional digitized quadrature modulator.
Figure 2:
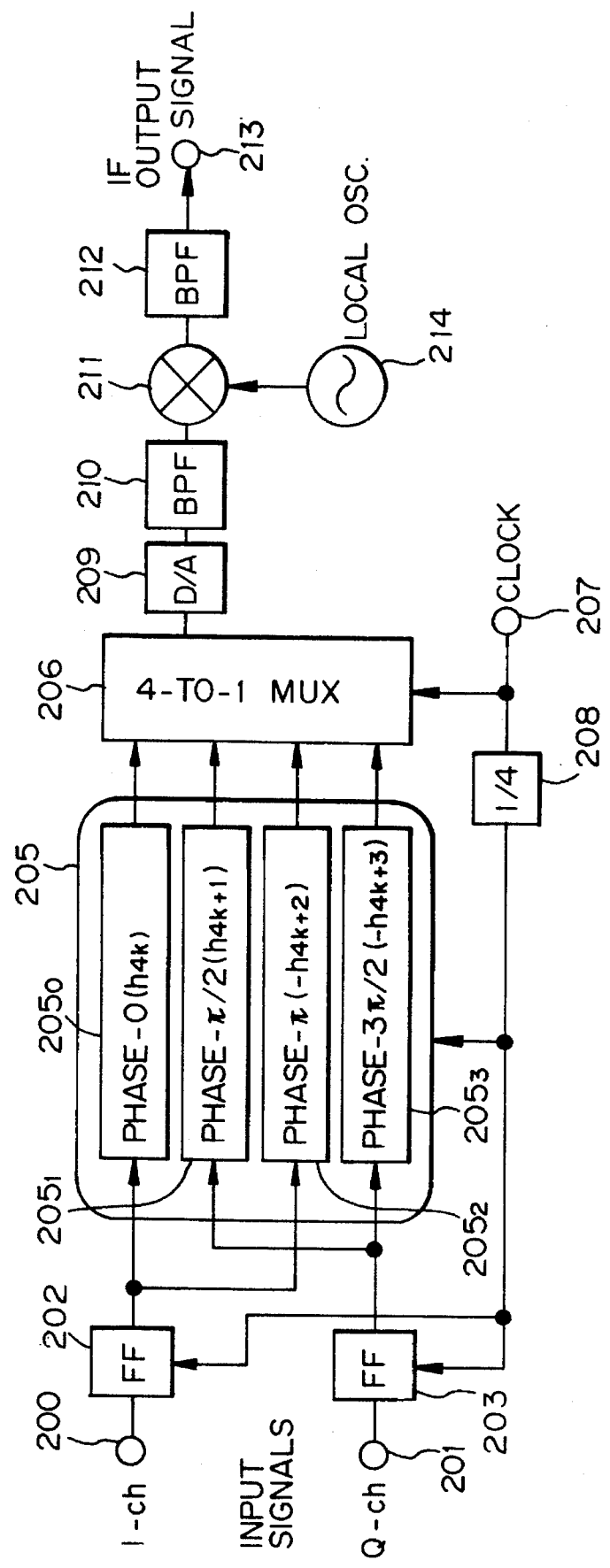
FIG. 2 shows the already described other constitution of the conventional digitized quadrature modulator.
Figure 3:
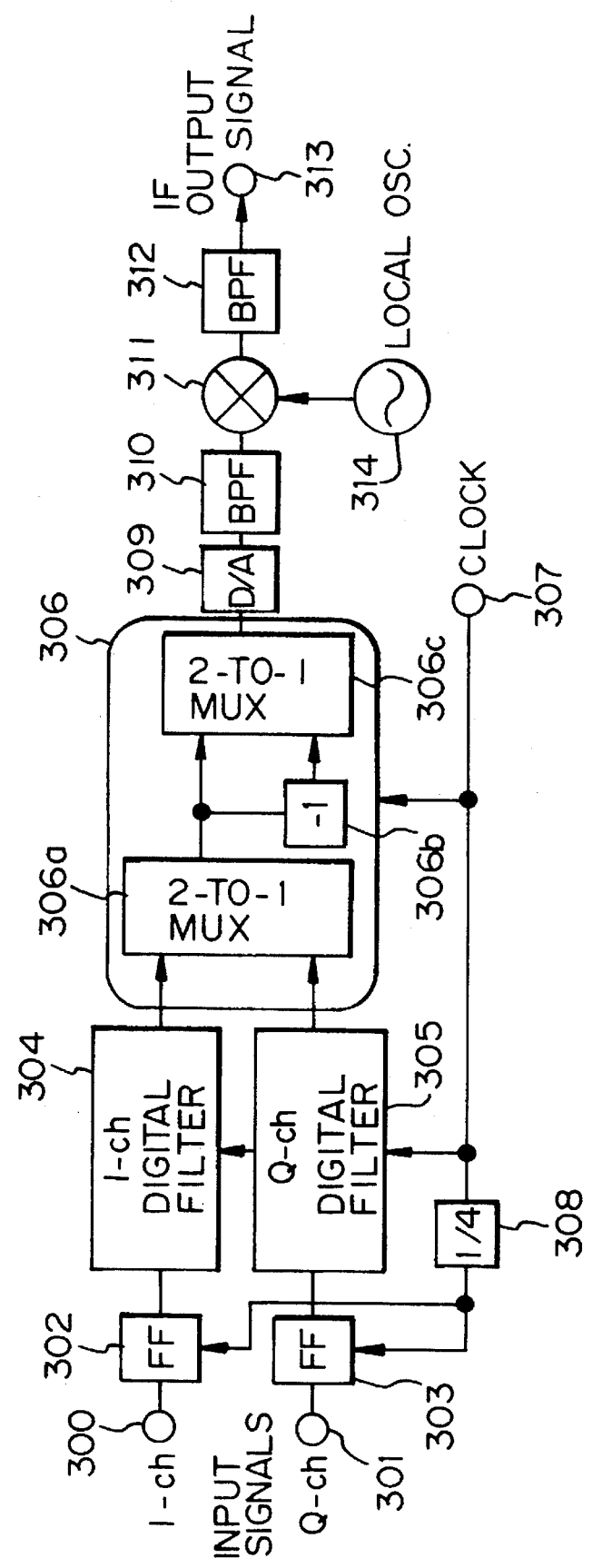
FIG. 3 shows the already described further constitution of the conventional digitized quadrature modulator.
Figure 4A:
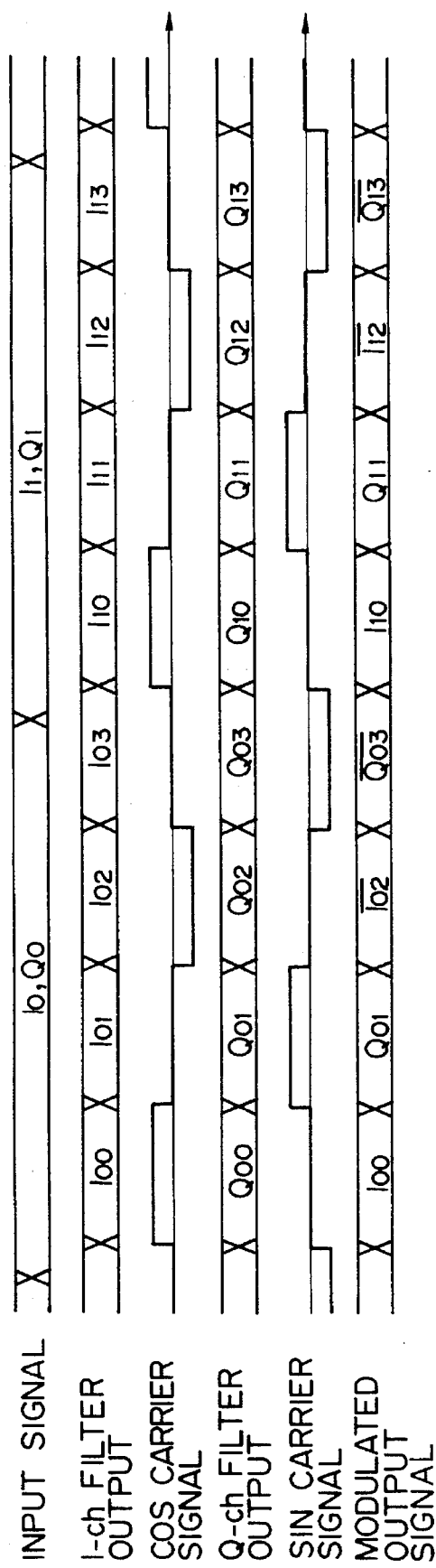
FIG. 4a illustrates a timing chart of signal processing in the conventional modulator.
Figure 4B:
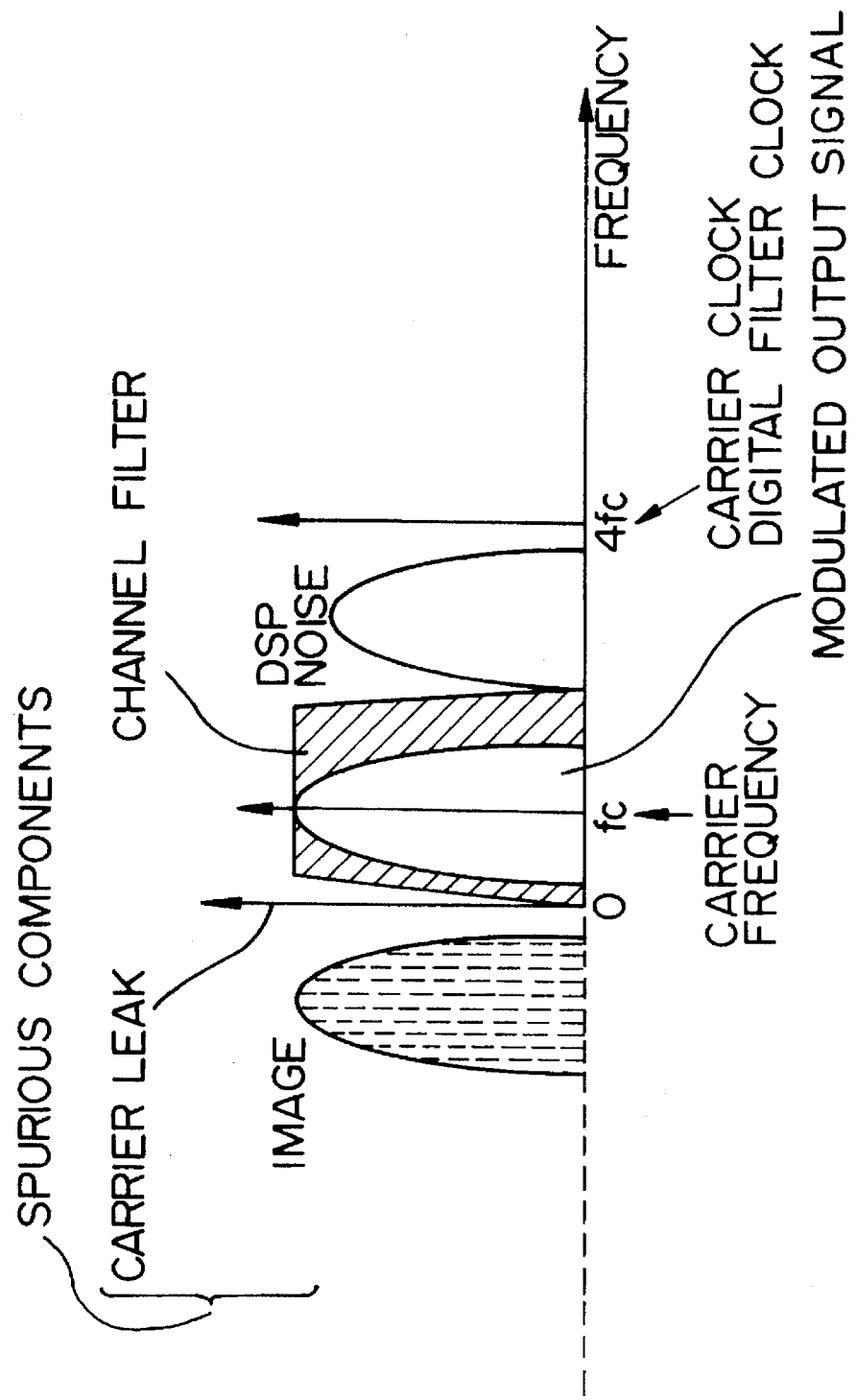
FIG. 4b illustrates a frequency arrangement of output from the D/A converter in the conventional modulator.
Figure 7:
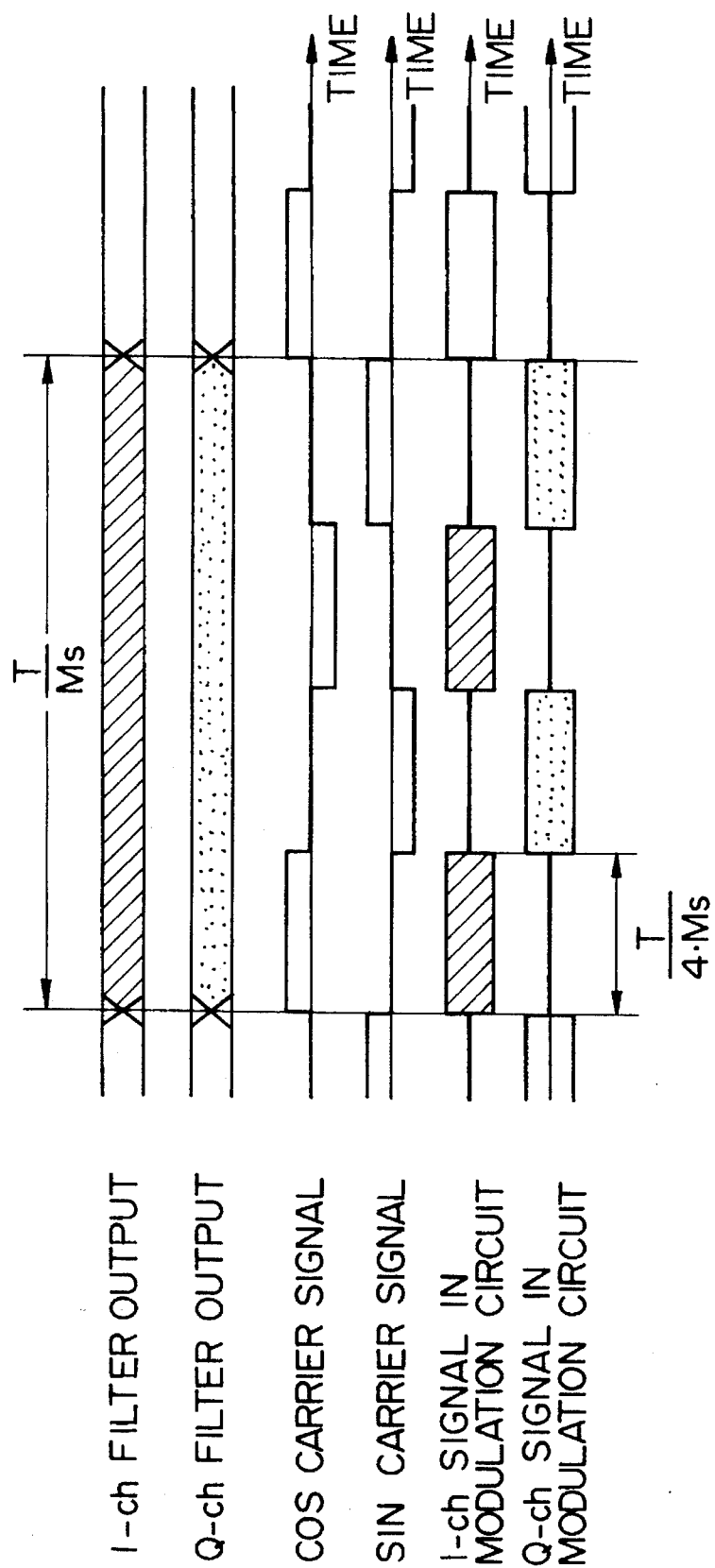
FIG. 7 illustrates a timing chart of signal processing in a digital filter having the same tap coefficient.

In this case, if the I-channel and Q-channel input signals are spectrum-shaped by the digital filter having the same tap coefficient as in the conventional quadrature modulator shown in FIG. 3, absence of a partial data on one of the I-channel and Q-channel may occur during the operation in the quadrature modulation circuit 505, as shown in FIG. 7. This absence of partial data on a channel will introduce a phase difference in timing when both channel data are multiplexed, causing the transmission characteristics to deteriorate.

Figure 8:
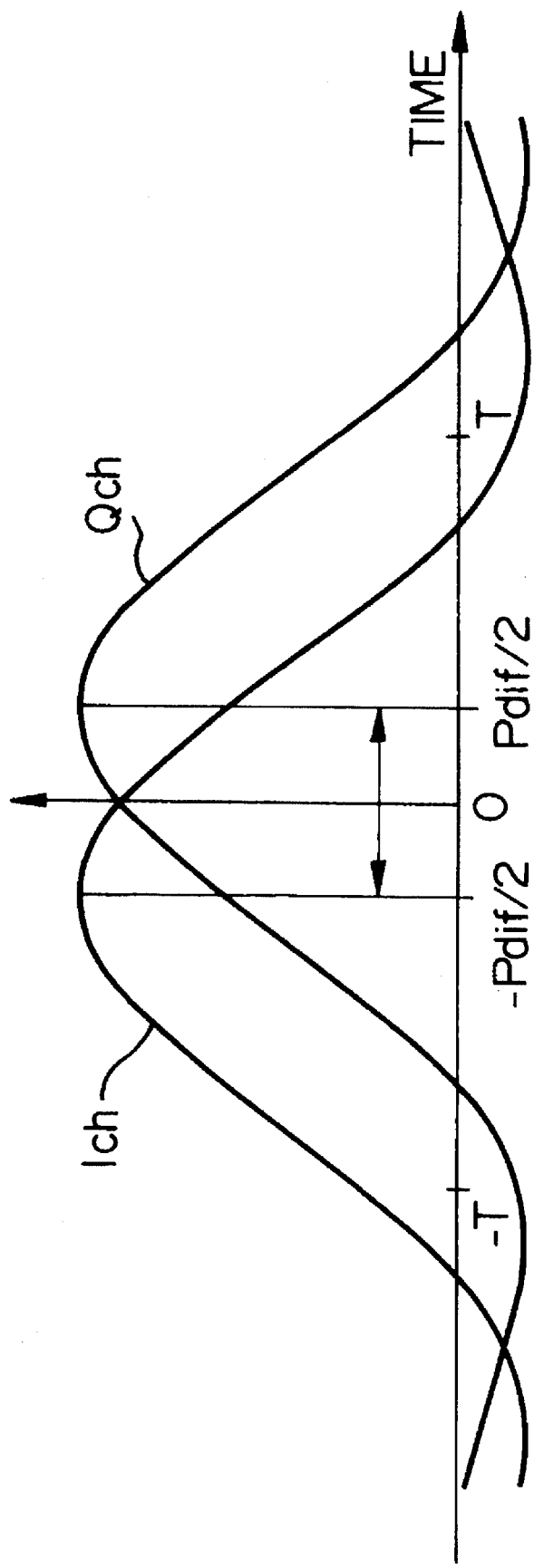
FIG. 8 illustrates a single pulse response to be provided in I-channel and Q-channel digital filters in the embodiment of FIG. 5.

Therefore, according to the present invention, as indicated in FIG. 8, phase of the digital filter 504 is preliminarily shifted between the I-channel and the Q-channel by an appropriate amount so as to compensate the phase difference caused by the data multiplexing. Namely, in the embodiment of FIG. 5, the digital filter 504 has different tap coefficients and thus provides a phase shift of an amount of $P_I-P_Q$ between both channels. This phase shift amount is produced by the circuit 504c which provides an impulse response $r(t+P_I)$ to the I-channel digital filter portion 504a, and by the circuit 504d which provides an impulse response $r(t+P_Q)$ to the Q-channel digital filter portion 504b, where $r(t)$ is a single impulse response of each of the digital filter portions 504a and 504b.

The phase difference $P_{dif}$ occurred between the I-channel and the Q-channel due to an absence of partial data on one channel is represented as;

$$P_{dif}=T/(M_s \cdot 2M_c)$$

where T is a symbol period (therefore 1/T is a symbol rate), $M_S$ is the number of samples per symbol in the digital filter and $M_C/2$ is a carrier cycle per an output data from the filter. In the embodiment of FIG. 5, since $M_S=4$ and $M_C=2$, the phase difference $P_{dif}$ is equal to T/16. The phase shift amount $P_I-P_Q$ of the digital filter 504, for compensating the phase difference $P_{dif}$ may be obtained by determining $P_I$ and $P_Q$ as; (1) $P_I=T/16$ and $P_Q=0$, (2) $P_I=T/32$ and $P_Q=-T/32$, or (3) $P_I=0$ and $P_Q=-T/16$.

The aforementioned phase shift can be indicated by using impulse response of each channel as follows:

(1) Since the channels are multiplexed in the sequence of I and then Q, the Q-channel signal will delay in phase from the I-channel signal. Thus, tap coefficients of both channels may be determined so as to delay the phase in the I-channel impulse response.

I-channel: $r(kT/4+T/16+t_0)$

Q-channel: $r(kT/4+t_0)$ (2) Tap coefficients of the both channels may be determined so as to delay the phase in the I-channel impulse response and to equally advance the phase in the Q-channel impulse response.

I-channel: $r(kT/4+T/32+t_0)$

Q-channel: $r(kT/4-T/32+t_0)$ (3) Tap coefficients of the both channels may be determined so as to advance the phase in the Q-channel impulse response.

I-channel: $r(kT/4+t_0)$

Q-channel: $r(kT/4-T/16+t_0)$ where k is a natural number and $t_0$ is an initial phase at sampling.

Figure 9:
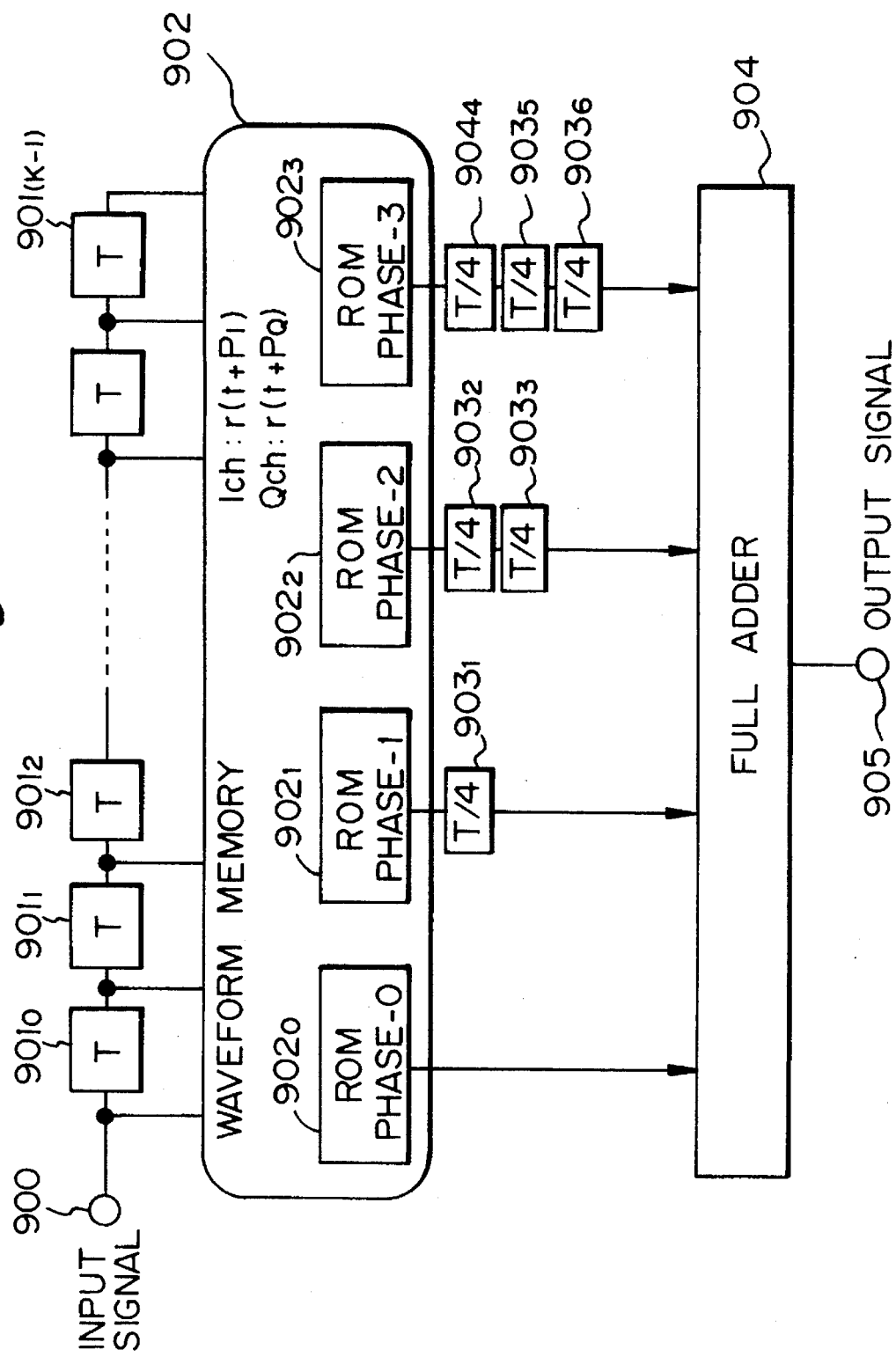
FIG. 9 shows a constitution of a digital filter in the embodiment of FIG. 5.

FIG. 9 is a block diagram of a constitution of each of the digital filter portions 504a and 504b shown in FIG. 5.

In the figure, reference numeral 900 denotes a signal input terminal, and $901_0$ to $901_{(K-1)}$ denote delay circuits each having a delay period of T (symbol period), connected to the input terminal 900 in series. Output terminals of the respective delay circuits $901_1$ to $901_{(K-1)}$ are connected to input terminals of a waveform memory 902.

The waveform memory 902 is constituted in this example by four ROMs $902_0$ to $902_3$ which preliminarily store amplitude information with respect to respective phases (Phase-0 to Phase-3). This information can be read out in response to an address which will be formed by outputs from the delay circuits. According to the present invention, the amplitude information stored in the ROMS $902_0$ to $902_3$ is phase-shifted by $P_I$ in the I-channel to provide the impulse response $r(t+P_I)$ and also phase-shifted by $P_Q$ in the Q-channel to provide the impulse response $r(t+P_Q)$, so that the phase shift amount between both channels becomes equal to $P_I-P_Q$.

Output terminals of the ROMS $902_0$ to $902_3$ are connected to input terminals of a full adder 904 directly, via a T/4 delay circuit $903_1$, via two T/4 delay circuits $903_2$ and $903_3$, and via three T/4 delay circuits $903_4$ to $903_6$, respectively. An output terminal 905 of the full adder 904 is connected to the one channel input terminal of the quadrature modulation circuit 505 in FIG. 5.

As will be understood from the above-description, the digital filter of this example provides the phase shift $P_I-P_Q$ between both channels by preliminarily phase-shifting the amplitude information stored in the memory 902.

Figure 10:
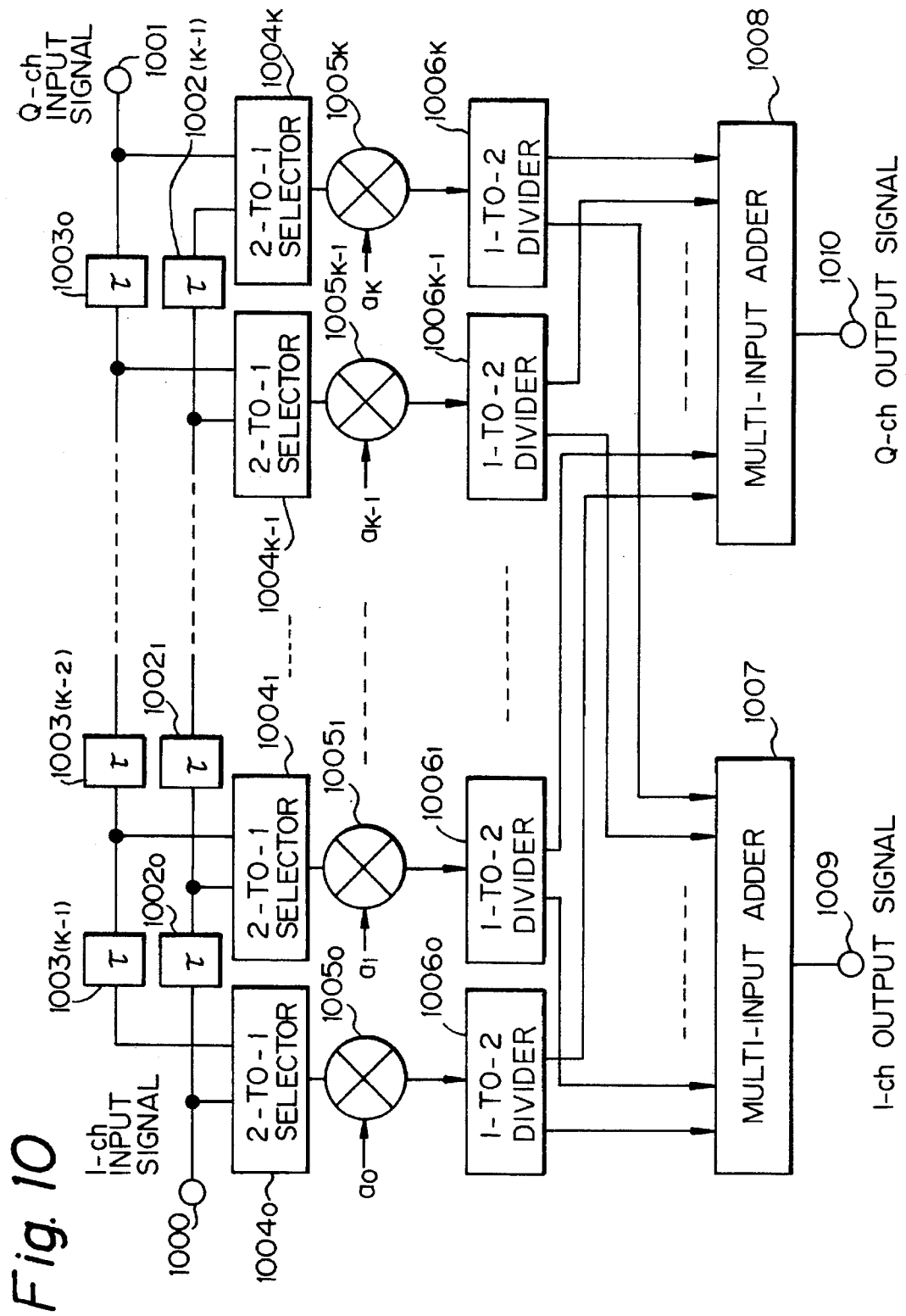
FIG. 10 shows another constitution of the digital filter.

FIG. 10 shows an another constitution of the digital filter which can provide the phase shift $P_I-P_Q$ between both channels. This digital filter is constituted by a single spectrum shaping filter of FIR type instead of the two digital filter portions 504a and 504b of the respective channels, shown in FIG. 5. In this digital filter, the tap coefficient for the I-channel is used as the tap coefficient for the Q-channel by inverting its time base and vice versa so that the tap coefficients are shared in both channels.

In FIG. 10, reference numeral 1000 denotes an I-channel signal input terminal, 1001 a Q-channel signal input terminal, $1002_0$ to $1002_{(K-1)}$ delay circuits each having a delay period of τ, connected to the I-channel input terminal 1000 in series, and $1003_0$ to $1003_{(K-1)}$ delay circuits each having a delay period of τ, connected to the Q-channel input terminal 1001 in series.

The I-channel input terminal 1000 and an output terminal of the delay circuit $1003_{(K-1)}$ are connected to input terminals of a two input multiplexer (2-to-1 selector) $1004_0$, output terminals of the delay circuits $1002_0$ and $1003_{(K-2)}$ are connected to an input terminals of a two input multiplexer $1004_1$, ..., output terminals of the delay circuits $1002_{(K-2)}$ and $1003_1$ are connected to input terminals of a two input multiplexer $1004_{(K-1)}$, and an output terminal of the delay circuit $1002_{(K-1)}$ and the Q-channel input terminal 1001 are connected to input terminals of a two input multiplexer $1004_K$, respectively.

Output terminals of the 2-to-1 selectors $1004_0$ to $1004_K$ are connected to one input terminal of multipliers $1005_0$ to $1005_K$, respectively. To the other input terminal of the multipliers $1005_0$ to $1005_K$, tap coefficients $a_0$ to $a_K$ are applied, respectively. Output terminals of the multipliers $1005_0$ to $1005_K$ are connected to input terminals of demultiplexers (1-to-2 dividers) $1006_0$ to $1006_K$. Two output terminals of each of the 1-to-2 dividers $1006_0$ to $1006_K$ are connected to input terminals of multi-input adders 1007 and 1008, respectively. Output terminals of the multi-input adders 1007 and 1008 are connected to an I-channel output terminal 1009 and a Q-channel output terminal 1010, respectively.

Input signals of the both channels are shifted by a period of τ(=T/4) to in the opposite directions to each other by means of the delay circuits $1002_0$ to $1002_{(K-1)}$ and $1003_0$ to $1003_{(K-1)}$, and then multiplexed by the 2-to-1 selectors $1004_0$ to $1004_K$. Thereafter, the multiplexed outputs from the 2-to-1 selectors are multiplied with the tap coefficients $a_0$ to $a_K$ at the multipliers $1005_0$ to $1005_K$, respectively. Outputs from the multipliers $1005_0$ to $1005_K$ are demultiplexed by the 1-to-2 dividers $1006_0$ to $1006_K$ into the respective channels, and then all the tap outputs from the 1-to-2 dividers are added with each other at the multi-input adders 1007 and 1008 to provide respective channel outputs of the digital filter.

Figure 11:
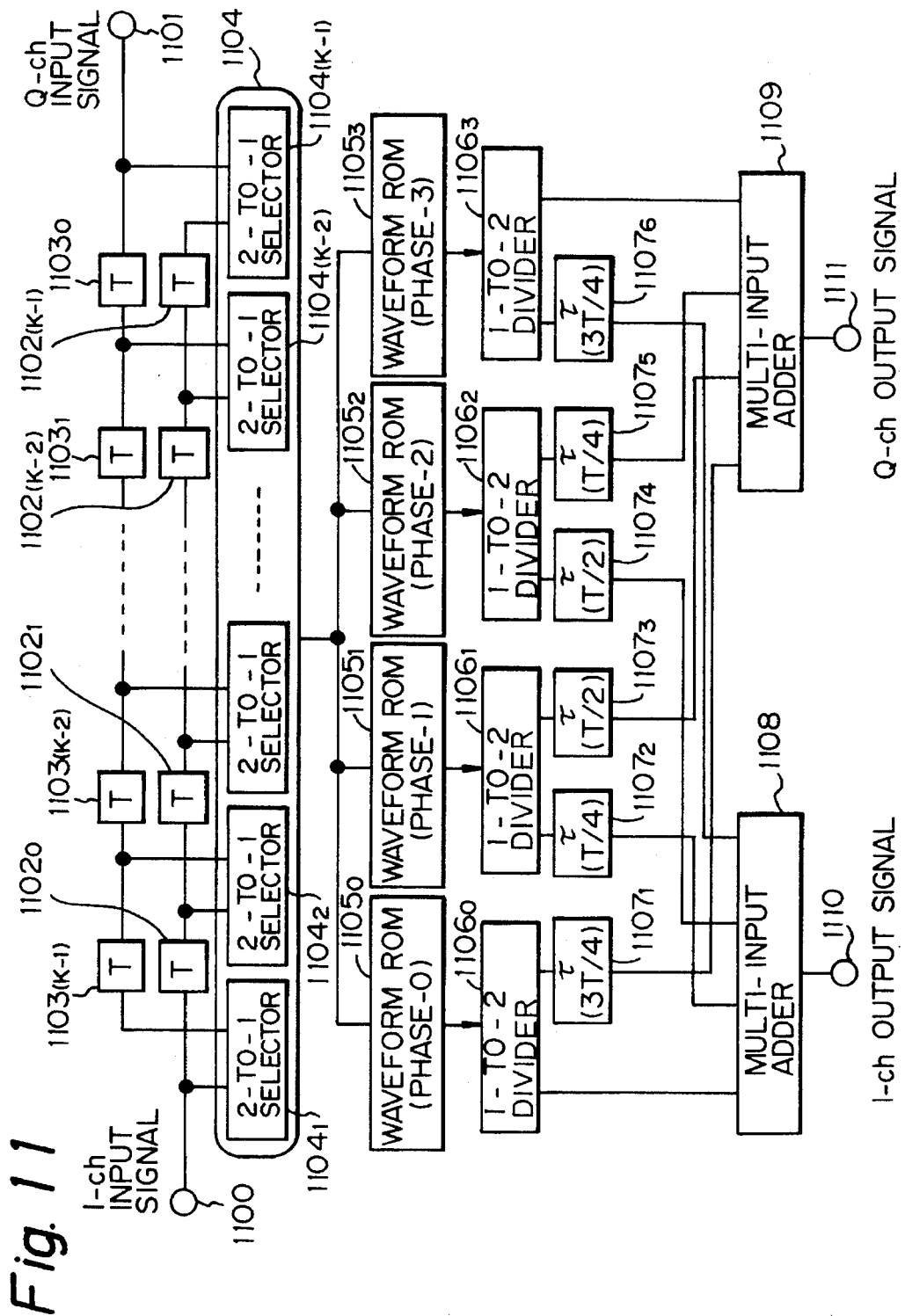
FIG. 11 shows an additional constitution of the digital filter.

FIG. 11 shows a still another constitution of the digital filter which can also provide the phase shift $P_I-P_Q$ between both channels. This digital filter is constituted by a single spectrum shaping filter of BPF type instead of the two digital filter portions 504a and 504b of the respective channels, shown in FIG. 5.

In FIG. 11, reference numeral 1100 denotes an I-channel signal input terminal, 1101 a Q-channel signal input terminal, $1102_0$ to $1102_{(K-1)}$ delay circuits each having a delay period of T, connected to the I-channel input terminal 1100 in series, and $1103_0$ to $1103_{(K-1)}$ delay circuits each having a delay period of T, connected to the Q-channel input terminal 1101 in series.

The I-channel input terminal 1100 and an output terminal of the delay circuit $1103_{(K-1)}$, output terminals of the delay circuits $1102_0$ and $1103_{(K-2)}$ ..., output terminals of the delay circuits $1102_{(K-2)}$ and $1103_1$, and an output terminal of the delay circuit $1102_{(K-1)}$ and the Q-channel input terminal 1101 are connected to input terminals of the 2-to-1 selectors $1104_0$ to $1104_K$, respectively.

Output terminals of the 2-to-1 selectors $1104_0$ to $1104_K$ are connected to one input terminals of waveform ROMs $1105_0$ to $1105_K$ which preliminarily store amplitude information with respect to respective phases (Phase-0 to Phase-3), respectively. Output terminals of the waveform ROMs $1105_0$ to $1105_K$ are connected to input terminals of demultiplexers (1-to-2 dividers) $1106_0$ to $1106_K$.

One output terminal of the 1-to-2 dividers $1106_0$ is directly connected to an input terminal of a multi-input adder 1108, and the other input terminal is connected to an input terminal of a multi-input adder 1109 via a 3T/4 delay circuit $1107_1$. One output terminal of the 1-to-2 dividers $1106_1$ is connected to an input terminal of the multi-input adder 1108 via a T/4 delay circuit $1107_2$, and the other input terminal is connected to an input terminal of the multi-input adder 1109 via a T/2 delay circuit $1107_3$. One output terminal of the 1-to-2 dividers $1106_2$ is connected to an input terminal of the multi-input adder 1108 via a T/2 delay circuit $1107_4$, and the other input terminal is connected to an input terminal of the multi-input adder 1109 via a T/4 delay circuit $1107_5$. One output terminal of the 1-to-2 dividers $1106_3$ is connected to an input terminal of the multi-input adder 1108 via a 3T/4 delay circuit $1107_6$, and the other input terminal is directly connected to an input terminal of the multi-input adder 1109. Output terminals of the multi-input adders 1108 and 1109 are connected to an I-channel output terminal 1110 and a Q-channel output terminal 1111, respectively.

Input signals of both channels are shifted by a period of T in the opposite direction to each other by means of the delay circuits $1102_0$ to $1102_{(K-1)}$ and $1103_0$ to $1103_{(K-1)}$, and then multiplexed by the 2-to-1 selectors $1104_0$ to $1104_K$. This information can be read out in response to an address which will be formed by the outputs from the delay circuits. Thereafter, the multiplexed outputs from the 2-to-1 selectors are applied to the waveform ROMs $1105_0$ to $1105_3$ of respective phases as addresses, and thus amplitude information is read out from the waveform ROMs. Outputs from the ROMs $1105_0$ to $1105_3$ are demultiplexed by the 1-to-2 dividers $1106_0$ to $1106_3$ into the respective channels, and then output signals of Phase-0 to Phase-3 in the each channel are respectively delayed as follows.

|         | I-channel | Q-channel |
|---------|-----------|-----------|
| Phase-0 | 0         | 3T/4      |
| Phase-1 | T/4       | T/2       |
| Phase-2 | T/2       | T/4       |
| Phase-3 | 3T/4      | 0         |

Thereafter, all the tap outputs are added with each other at the multi-input adders 1108 and 1109 to provide respective channel outputs of the digital filter.

As described herein before, according to the digital filters of FIGS. 10 and 11, the signal phases in the I-channel and Q-channel are equally shifted in advance and delay directions by a half ($P_{dif}/2$) of the phase difference $P_{dif}$ produced between the I-channel and the Q-channel due to the DSP quadrature modulation, and also the same filter circuit is utilized from both directions to invert its time base, so that a phase shift corresponding to the phase difference $P_{dif}$ is provided between the input signals of the I-channel and the Q-channel. Namely, the phase characteristics of the digital filter is designed to be shifted in advance and delay directions by $P_{dif}/2$ and the tap coefficients for the both channels are used by inverting their time base. Thus, the filter circuit can be utilized in a time sharing manner without using a complicated additional circuit causing the circuit structure to be simplified. The frequency of the clock used in the digital filter will not be higher than that of the modulation clock even if the filter circuit is commonly used in the time sharing manner because the original clock frequency in the digital filter is less than a half of the modulation clock frequency.

Figure 12:
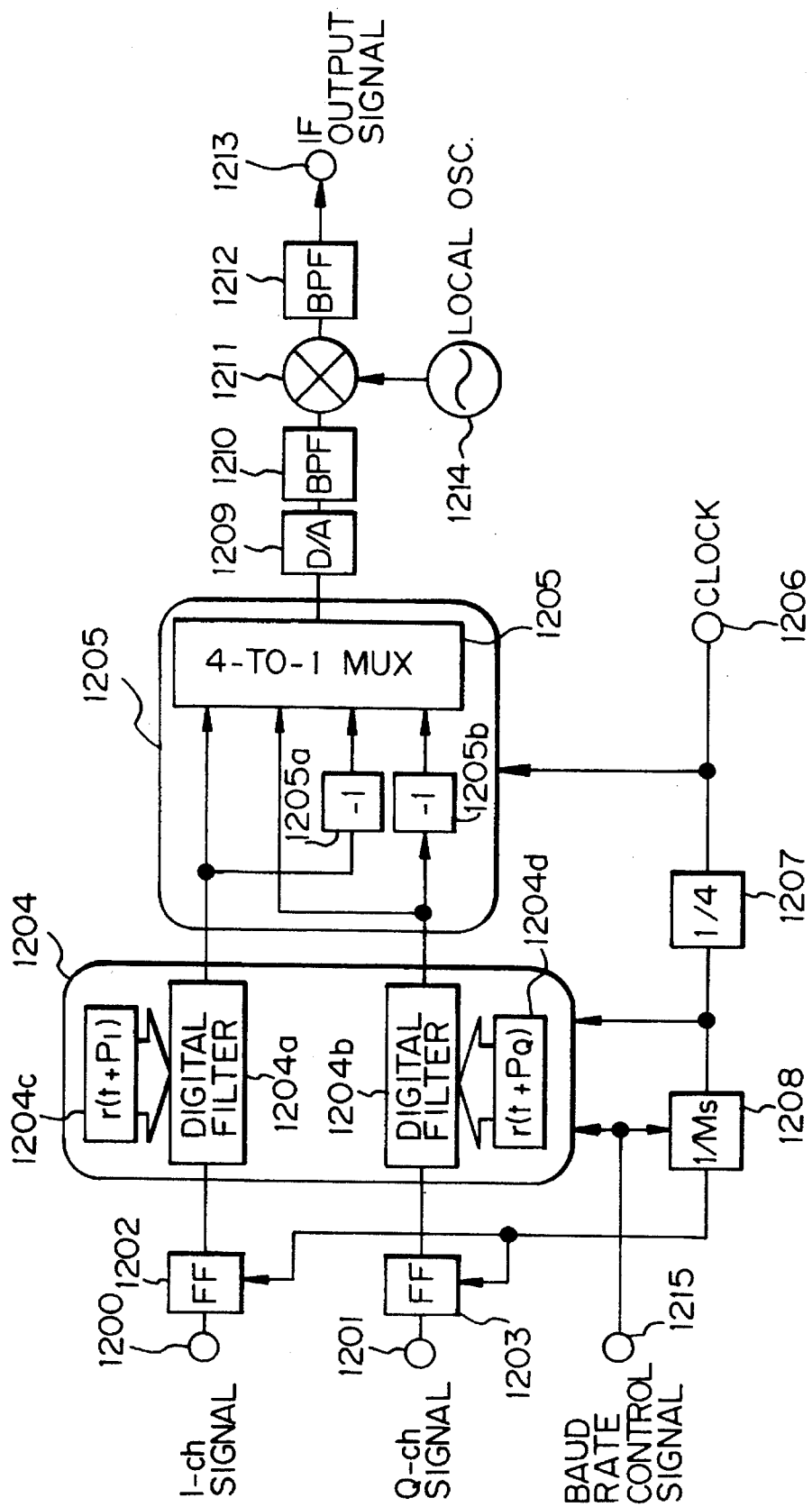
FIG. 12 schematically shows a whole constitution of another embodiment of a digitized quadrature modulator according to the present invention.

FIG. 12 is a block diagram which schematically shows a whole constitution of an another embodiment of a digitized quadrature modulator according to the present invention. The quadrature modulator of this embodiment has a variable baud rate control function in addition to the functions provided in the modulator of FIG. 5.

In the figure, reference numeral 1200 denotes an in-phase channel (I-channel) signal input terminal, 1201 a quadrature channel (Q-channel) signal input terminal, 1202 a flip-flop connected to the signal input terminal 1200 for sampling I-channel input signal, 1203 a flip-flop connected to the signal input terminal 1201 for sampling Q-channel input signal, and 1204 a digital filter.

The digital filter 1204 is constituted, in this embodiment, by an I-channel digital filter portion 1204a, a Q-channel digital filter portion 1204b, a circuit 1204c for providing an impulse response $r(t+P_I)$ with phase shift amount of $P_I$ to the I-channel filter portion 1204a, and a circuit 1204d for providing an impulse response $r(t+P_Q)$ with phase shift amount of $P_Q$ to the Q-channel filter portion 1204b, where $r(t)$ corresponds to a normal impulse response of each of the digital filter portions 1204a and 1204b.

An output terminal of the I-channel filter portion 1204a is connected directly to a first input terminal of a four input multiplexer (4-to-1 selector) 1205c in a quadrature modulation circuit 1205, and also connected to a third input terminal of the multiplexer 1205c via a first complementer 1205a for taking the complement of its input signal. An output terminal of the Q-channel filter portion 1204b is connected directly to a second input terminal of the multiplexer 1205c, and also connected to a fourth input terminal of the multiplexer 1205c via a second complementer 1205b for taking the complement of its input signal.

A clock input terminal 1206 is connected to a ¼ clock frequency divider 1207 and to a clock input terminal of the multiplexer 1205c. An output terminal of the divider 1207 is connected to clock input terminals of the digital filter portions 1204a and 1204b, and also to control terminals of the flip-flops 1202 and 1203 via a $1/M_S$ clock frequency divider 1208.

An output terminal of the multiplexer 1205c is coupled to an IF modulated signal output terminal 1213 via a digital-analog (D/A) converter 1209, a bandpass filter (BPF) 1210, a mixer 1211 and a BPF 1212. To the mixer 1211, an output terminal of a local oscillator 1214 is also connected.

An input terminal 1215, which will receive a baud rate control signal, is connected to control inputs of the $1/M_S$ clock frequency divider 1208 and to the digital filter 1204.

In this quadrature modulator, I-channel and Q-channel input signals are sampled by clocks having $1/4M_S$ frequency of the system clock (clock for the modulation), and then the sampled signals are applied to the I-channel and Q-channel filter portions 1204a and 1204b, respectively. These signals are outputted after being spectrum-shaped and bandlimited in the digital filter portions to the quadrature modulation circuit 1205.

In the modulation circuit 1205, the I-channel and Q-channel outputs from the filter 1204 and inverted signals of these outputs are multiplexed at a predetermined sequence (i.e. first, output (I) from the I-channel filter 1204a, then, output (Q) from the Q-channel filter 1204b, then, output ($\bar{I}$) from the first complementer 1205a, and lastly, output ($\bar{Q}$) from the second complementer 1205b) at every time slot of the output, by means of the multiplexer 1205c, and thus, a baseband quadrature modulated output signal is provided.

Since the modulation circuit 1205 is constituted by the high-speed circuit such as the complementers and the selector, it is very easy to raise the carrier frequency (center frequency of an IF modulated output signal). If the carrier frequency is raised, as shown in FIG. 6b, folding noises (DSP noises) caused by the DSP and spurious components such as carrier leak and image caused by the frequency conversion will be produced at frequencies far from that of the IF modulated output signal (carrier frequency). As a result, these DSP noise and spurious components can be sufficiently eliminated by an analog BPF having a relative wide bandpass width so as to not deteriorate transmission characteristics of the modulator. This causes the design of the analog signal processing components to become very easy.

In this case, if the I-channel and Q-channel input signals are spectrum-shaped by the digital filter having the same tap coefficient as in the conventional quadrature modulator shown in FIG. 3, absence of a partial data on one of the I-channel and Q-channel may occur during the operation in the quadrature modulation circuit 1205, as shown in FIG. 7. This absence of partial data on the channel will introduce a phase difference in timing when both channel data are multiplexed, causing the transmission characteristics to deteriorate.

Therefore, according to the present invention, as indicated in FIG. 8, phase of the digital filter 1204 is preliminarily shifted between the I-channel and the Q-channel by an appropriate amount so as to compensate the phase difference caused by data multiplexing. Namely, the digital filter 1204 has different tap coefficients and thus provides a phase shift of an amount of $P_I-P_Q$ between both channels. This phase shift amount is produced by the circuit 1204c which provides an impulse response $r(t+P_I)$ to the I-channel digital filter portion 1204a, and by the circuit 1204d which provides an impulse response $r(t+P_Q)$ to the Q-channel digital filter portion 1204b, where $r(t)$ is a single impulse response of each of the digital filter portions 1204a and 1204b.

The phase difference $P_{dif}$, occurring between the I-channel and the Q-channel due to an absence of partial data on one channel, is represented as well as that in the embodiment of FIG. 5. Namely, $$P_{dif}=T/(M_S \cdot 2M_C)$$

where T is a symbol period, $M_S$ is the number of samples per symbol in the digital filter and $M_C / 2$ is a carrier cycle per an output data from the filter. In the embodiment of FIG. 12, since $M_S$ is variable for controlling the baud rate and $M_C=2$, the phase difference $P_{dif}$ is equal to $T / 4M_S$. The phase shift amount $P_I-P_Q$ of the digital filter 1204, for compensating the phase difference $P_{dif}$ may be obtained by determining $P_I$ and $P_Q$ as; (1) $P_I=T / 4M_S$ and $P_Q=0$, (2) $P_I=T / 8M_S$ and $P_Q=-T /8M_S$, or (3) $P_I=0$ and $P_Q=-T / 4M_S$.

In this embodiment, the baud rate is allowed to select one of for example full rate (in case of $M_S=4$) and half rate (in case of $M_S=8$) by changing the number of samples per symbol $M_S$ and by selecting the waveform memory and the accumulator output, depending upon the baud rate control signal. It should be noted that the operation speed in the digital filter 1204 and in the quadrature modulation circuit 1205 is constant (clock cycle is T/4). The number of selectable baud rate is not limited to two as aforementioned, but can be determined to any value more than two.

By implementing the variable baud rate control, modulated output signals can be obtained without changing circuit constant of the analog signal processing circuit, even when input signals have a plurality of baud rates. In other words, a plurality of DSP quadrature modulated output signals having the same center frequency can be produced by applying a control signal for indicating the baud rate of the input signal to vary the sampling cycle in the digital filter.

The center frequency $f_c$ of the modulated output signal provided by the DSP quadrature modulation is represented as;

$$f_c=f_{ck}/4$$

where $f_{ck}$ is a frequency of the clock used in the quadrature modulation circuit. Thus, if the number of samples per symbol $M_S$ in the digital filter is varied in accordance with the input signal Dn having a variable baud rate (clock frequency of $f_n$) as;

$$M_S=f_{ck}/4f_n$$

and spectrum shaping in the digital filter is executed by a clock frequency of $M_S f_n$, the clock frequency being $f_{ck}$ and therefore the center frequency of the modulated output signal can be always maintained constant.

The BPF for eliminating DSP noises should be designed so as to eliminate the DSP noises without deteriorating transmission characteristics, with respect to the maximum baud rate input signal among various baud rate input signals. If so designed, since the number of samples per symbol with respect to the other input signals having a lower baud rate is greater than that of the maximum rate signal, the DSP noises will be separated out of the pass band of this BPF. Accordingly, such noises due to the various baud rate input signals can be effectively eliminated by a single BPF.

As described herein before, according to the quadrature modulator of FIG. 12, the number of samples per symbol in the digital filter is varied in accordance with input signals having a plurality of baud rates and a BPF for eliminating DSP noises is designed to fit with the maximum baud rate input signal. Therefore, modulated output signals having the same center frequency can be obtained resulting in no need for changing the circuit constant of the analog signal processing circuit, even when input signals have a plurality of baud rates.

Constitution and operation for the variable baud rate control in the digital filter will be described in an embodiment of FIG. 13.

Figure 13:
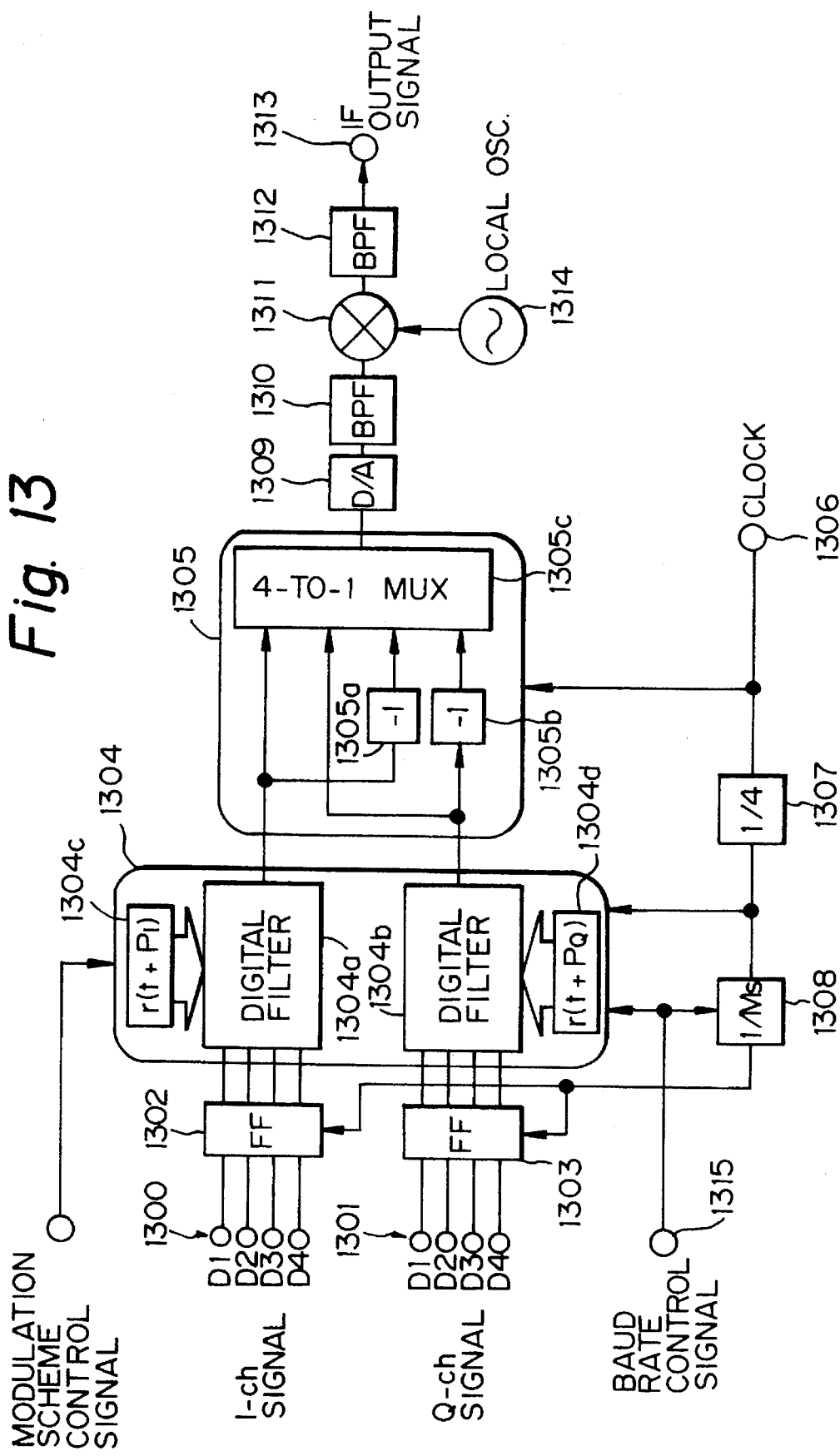
FIG. 13 schematically shows a whole constitution of an additional embodiment of a digitized quadrature modulator according to the present invention.

FIG. 13 is a block diagram which schematically shows a whole constitution of a still another embodiment of a digitized quadrature modulator according to the present invention. The modulator of this embodiment receives n-sequences (n=4) input signals and has a variable baud rate control function and a variable modulation scheme control function in addition to the functions provided in the modulator of FIG. 5.

In the figure, reference numeral 1800 denotes an in-phase channel (I-channel) input terminal for four input signals (D1 to D4), 1301 a quadrature channel (Q-channel) input terminal for four input signals (D1 to D4), 1302 flip-flops connected to the signal input terminal 1300 for sampling I-channel input signals, 1303 flip-flops connected to the signal input terminal 1301 for sampling Q-channel input signals, and 1304 a digital filter.

The digital filter 1304 is constituted, in this embodiment, by an I-channel digital filter portion 1304a, a Q-channel digital filter portion 1304b, a circuit 1304c for providing an impulse response $r(t+P_I)$ with phase shift amount of $P_I$ to the I-channel filter portion 1304a, and a circuit 1304d for providing an impulse response $r(t+P_Q)$ with phase shift amount of $P_Q$ to the Q-channel filter portion 1304b, where $r(t)$ corresponds a normal impulse response of each the digital filter portions 1304a and 1304b.

An output terminal of the I-channel digital filter portion 1304a is connected directly to a first input terminal of a four input multiplexer (4-to-1 selector) 1305c in a quadrature modulation circuit 1305, and also connected to a third input terminal of the multiplexer 1305c via a first complementer 1305a for taking the complement of its input signal. An output terminal of the Q-channel digital filter portion 1304b is connected directly to a second input terminal of the multiplexer 1305c, and also connected to a fourth input terminal of the multiplexer 1305c via a second complementer 1305b for taking the complement of its input signal.

A clock input terminal 1306 is connected to a ¼ clock frequency divider 1307 and to a clock input terminal of the multiplexer 1305c. An output terminal of the divider 1307 is connected to clock input terminals of the digital filter portions 1304a and 1304b, and also to control terminals of the flip-flops 1302 and 1303 via a 1 / $M_S$ clock frequency divider 1308.

An output terminal of the multiplexer 1305c is coupled to an IF modulated signal output terminal 1313 via a digital-analog (D/A) converter 1309, a bandpass filter (BPF) 1310, a mixer 1311 and a BPF 1312. To the mixer 1311, an output terminal of a local oscillator 1314 is also connected.

An input terminal 1315, which will receive a baud rate control signal, is connected to control inputs of the 1 / $M_S$ clock frequency divider 1308 and to the digital filter 1304. An input terminal 1316, which will receive a modulation scheme control signal, is connected to the digital filter 1304.

In this quadrature modulator, I-channel and Q-channel input signals are sampled by clocks having 1 / $4M_S$ frequency of the system clock (clock for the modulation), and then the sampled signals are applied to the I-channel and Q-channel filter portions 1304a and 1304b, respectively. These signals are output after being spectrum-shaped and bandlimited in the filter portions to the modulation circuit 1305.

In the circuit 1305, I-channel and Q-channel outputs from the filter 1304 and inverted signals of these outputs are multiplexed at a predetermined sequence (i.e. first, output (I) from the I-channel filter 1304a, then, output (Q) from the Q-channel filter 1304b, then, output (Ī) from the first complementer 1305a, and lastly, output (Q̄) from the second complementer 1305b) at every time slot of the output, by means of the multiplexer 1305c, and thus, a baseband quadrature modulated output signal is provided.

Since the modulation circuit 1305 is constituted by the high-speed circuit such as the complementers and the selector, it is very easy to raise the carrier frequency (center frequency of an IF modulated output signal). If the carrier frequency is raised, as shown in FIG. 6b, folding noises (DSP noises) caused by the DSP and spurious components such as carrier leak and image caused by the frequency conversion will be produced at frequencies far from that of the IF modulated output signal (carrier frequency). As a result, these DSP noise and spurious components can be sufficiently eliminated by an analog BPF having a relative wide bandpass width so as to not deteriorate transmission characteristics of the modulator. This causes the design of the analog signal processing components to become very easy.

In this case, if the I-channel and Q-channel input signals are spectrum-shaped by the digital filter having the same tap coefficient as in the conventional quadrature modulator shown in FIG. 3, absence of a partial data on one of the I-channel and Q-channel may occur during the operation in the modulation circuit 1305, as shown in FIG. 7. This absence of partial data on channel will introduce a phase difference in timing when both channel data are multiplexed, causing the transmission characteristics to deteriorate.

Therefore, according to the present invention, as indicated in FIG. 8, phase of the digital filter 1304 is preliminarily shifted between the I-channel and the Q-channel by an appropriate amount so as to compensate the phase difference caused by the data multiplexing. Namely, the digital filter 1304 has different tap coefficients and thus provides a phase shift of an amount of $P_I-P_Q$ between both channels. This phase shift amount is produced by the circuit 1304c which provides an impulse response $r(t+P_I)$ to the I-channel filter portion 1304a, and by the circuit 1304d which provides an impulse response $r(t+P_Q)$ to the Q-channel filter portion 1304b, where $r(t)$ is a single impulse response of each the digital filter portions 1304a and 1304b.

The phase difference $P_{dif}$ occurring between the I-channel and the Q-channel, due to an absence of partial data on one channel is represented as well as that in the embodiment of FIG. 5. Namely, $$P_{dif}=T/(M_s \cdot 2M_C)$$

where T is a symbol period, $M_S$ is the number of samples per symbol in the digital filter and $M_C / 2$ is a carrier cycle per an output data from the filter. In the embodiment of FIG. 13, since $M_S$ is variable for controlling the baud rate and $M_C=2$, the phase difference $P_{dif}$ is equal to $T / 4M_S$. The phase shift amount $P_I-P_Q$ of the digital filter 1304, for compensating the phase difference $P_{dif}$ may be obtained by determining $P_I$ and $P_Q$ as; (1) $P_I=T / 4M_S$ and $P_Q=0$, (2) $P_I=T / 8M_S$ and $P_Q=-T /8M_S$, or (3) $P_I=0$ and $P_Q=-T / 4M_S$.

In this embodiment, the baud rate is allowed to select one of, for example, full rate (in case of $M_S=4$) and half rate (in case of $M_S=8$) by changing the number of samples per symbol $M_S$ and by selecting the waveform memory and the accumulator output, depending upon the baud rate control signal. It should be noted that the operation speed In the digital filter 1304 and in the modulation circuit 1305 is constant (clock cycle is T/4). The number of selectable baud rates is not limited to two as aforementioned, but can be determined to any value more than two. Furthermore, in this embodiment, the modulation scheme can be variably selected from multivalued modulation of QPSK to 256QAM.

The constitution and operation for the variable baud rate control and the variable modulation scheme control in the digital filter, and also advantages of this embodiment will be described in an embodiment of FIG. 14.

Figure 14:
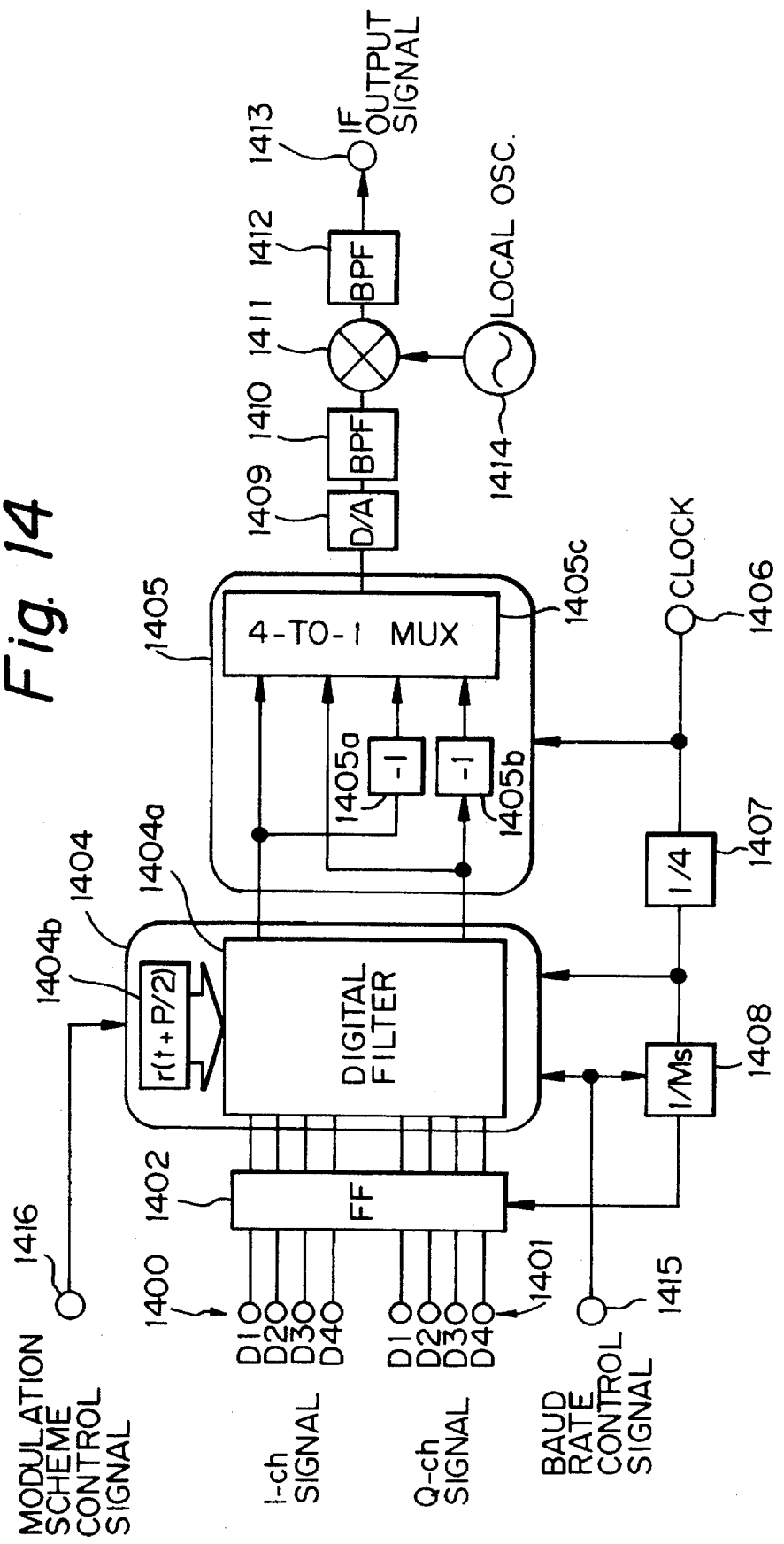
FIG. 14 schematically shows a whole constitution of a further embodiment of a digitized quadrature modulator according to the present invention.

FIG. 14 is a block diagram which schematically shows a whole constitution of a further embodiment of a digitized quadrature modulator according to the present invention. The modulator of this embodiment receives n-sequences (n–4) input signals and has a variable baud rate control function and a variable modulation scheme control function in addition to the functions provided in the modulator of FIG. 5.

In the figure, reference numeral 1400 denotes an in-phase channel (I-channel) input terminal for four input signals (D1 to D4), 1401 a quadrature channel (Q-channel) input terminal for four input signals (D1 to D4), 1402 flip-flops connected to the signal input terminal 1400 for sampling I-channel input signals and to the signal input terminal 1401 for sampling Q-channel input signals, and 1404 a digital filter.

The digital filter 1404 is constituted, in this embodiment, by a digital filter portion 1404a commonly used for the I-channel and Q-channel, and a circuit 1404b for providing an impulse response $r(t+P/2)$ with phase shift of P/2 to the filter portion 1404a, where r(t) corresponds to a normal impulse response of the digital filter portion 1404a.

An I-channel output terminal of the filter portion 1404a is connected directly to a first input terminal of a four input multiplexer (4-to-1 selector) 1405c in a quadrature modulation circuit 1405, and also connected to a third input terminal of the multiplexer 1405c via a first complementer 1405a for taking the complement of its Input signal. A Q-channel output terminal of the filter portion 1404a is connected directly to a second input terminal of the multiplexer 1405c, and also connected to a fourth input terminal of the multiplexer 1405c via a second complementer 1405b for taking the complement of its input signal.

A clock input terminal 1406 is connected to a ¼ clock frequency divider 1407 and to a clock input terminal of the multiplexer 1405c. An output terminal of the divider 1407 is connected to a clock input terminal of the filter portion 1404a, and also to a control terminal of the flip-flops 1402 via a $1/M_S$ clock frequency divider 1408.

An output terminal of the multiplexer 1405c is coupled to an IF modulated signal output terminal 1413 via a digital-analog (D/A) converter 1409, a bandpass filter (BPF) 1410, a mixer 1411 and a BPF 1412. To the mixer 1411, an output terminal of a local oscillator 1414 is also connected.

An input terminal 1415, which will receive a baud rate control signal, is connected to control inputs of the $1/M_S$ clock frequency divider 1408 and to the digital filter 1404. An input terminal 1416, which will receive a modulation scheme control signal, is connected to the digital filter 1404.

In this quadrature modulator, I-channel and Q-channel input signals are sampled by clocks having $1/4M_S$ frequency of the system clock (clock for the modulation), and then the sampled signals are applied to the filter portion 1404a. These signals are output, after being spectrum-shaped and bandlimited in the filter portion, to the modulation circuit 1405.

In the modulation circuit 1405, the I-channel and Q-channel outputs from the filter 1404 and inverted signals of these outputs are multiplexed at a predetermined sequence (i.e. first, I-channel output (I) from the digital filter, then, Q-channel output (Q) the digital filter, then, output ($\overline{\text{I}}$) from the first complementer 1405a, and lastly, output ($\overline{\text{Q}}$) from the second complementer 1405b) at every time slot of the output, by means of the multiplexer 1405c, and thus, a baseband quadrature modulated output signal is provided.

Since the quadrature modulation circuit 1405 is constituted by the high-speed circuit such as the complementers and a selector, it is very easy to raise the carrier frequency (center frequency of an IF modulated output signal). If the carrier frequency is raised, as shown in FIG. 6b, folding noises (DSP noises) caused by the DSP and spurious components such as carrier leak and image caused by the frequency conversion will be produced at frequencies far from that of the IF modulated output signal (carrier frequency). As a result, these DSP noise and spurious components can be sufficiently eliminated by an analog BPF having a relative wide bandpass width so as not to deteriorate transmission characteristics of the modulator. This causes the design of the analog signal processing components to become very easy.

In this case, if the I-channel and Q-channel input signals are spectrum-shaped by the digital filter having the same tap coefficient as in the conventional quadrature modulator shown in FIG. 3, absence of a partial data on one of the I-channel and Q-channel may occur during the operation in the modulation circuit 1405, as shown in FIG. 7. This absence of partial data on the channel will introduce a phase difference in timing when both channel data are multiplexed, causing the transmission characteristics to deteriorate.

Therefore, according to the present invention, as indicated in FIG. 8, phase of the digital filter 1404 is preliminarily shifted between the I-channel and the Q-channel by an appropriate amount so as to compensate the phase difference caused by the data multiplexing. Namely, the digital filter 1404 has different tap coefficients and thus provides a phase shift of an amount of $P_I-P_Q=2P_I$ (or $2P_Q$) between both channels. This phase shift amount is produced by the circuit 1404b which provides an impulse response $r(t+P_I)$ to the I-channel side and provides an impulse response $r(t+P_Q)$ to the Q-channel side, where r(t) is a single impulse response of the filter portion 1404a.

The phase difference $P_{dif}$, occurring between the I-channel and the Q-channel, due to an absence of partial data on one channel, is represented as well as that in the embodiment of FIG. 5. Namely, $$P_{dif}=T/(M_S \cdot 2M_C)$$

where T is a symbol period, $M_S$ is the number of samples per symbol in the digital filter and $M_C/2$ is a carrier cycle per an output data from the filter. In the embodiment of FIG. 14, since $M_S$ is variable for controlling the baud rate and $M_C=2$, the phase difference $P_{dif}$ is equal to $T/4M_S$. The phase shift amount $P_I-P_Q$ of the digital filter 1404, for compensating the phase difference $P_{dif}$ is determined in this embodiment as $P_I=T/8M_S$ and $P_Q=-T/8M_S$.

In this embodiment, the baud rate is allowed to select one of, for example, full rate (in case of $M_S=4$) and half rate (in case of $M_S=8$) by changing the number of samples per symbol $M_S$ and by selecting the waveform memory and the accumulator output, depending upon the baud rate control signal. It should be noted that the operation speed in the digital filter 1404 and in the modulation circuit 1405 is constant (clock cycle is T/4). The number of selectable baud rate is not limited to two as aforementioned, but can be determined to any value more than two. Furthermore, in this embodiment, the modulation scheme can be variably selected from multivalued modulation of QPSK to 256QAM.

Figure 15:
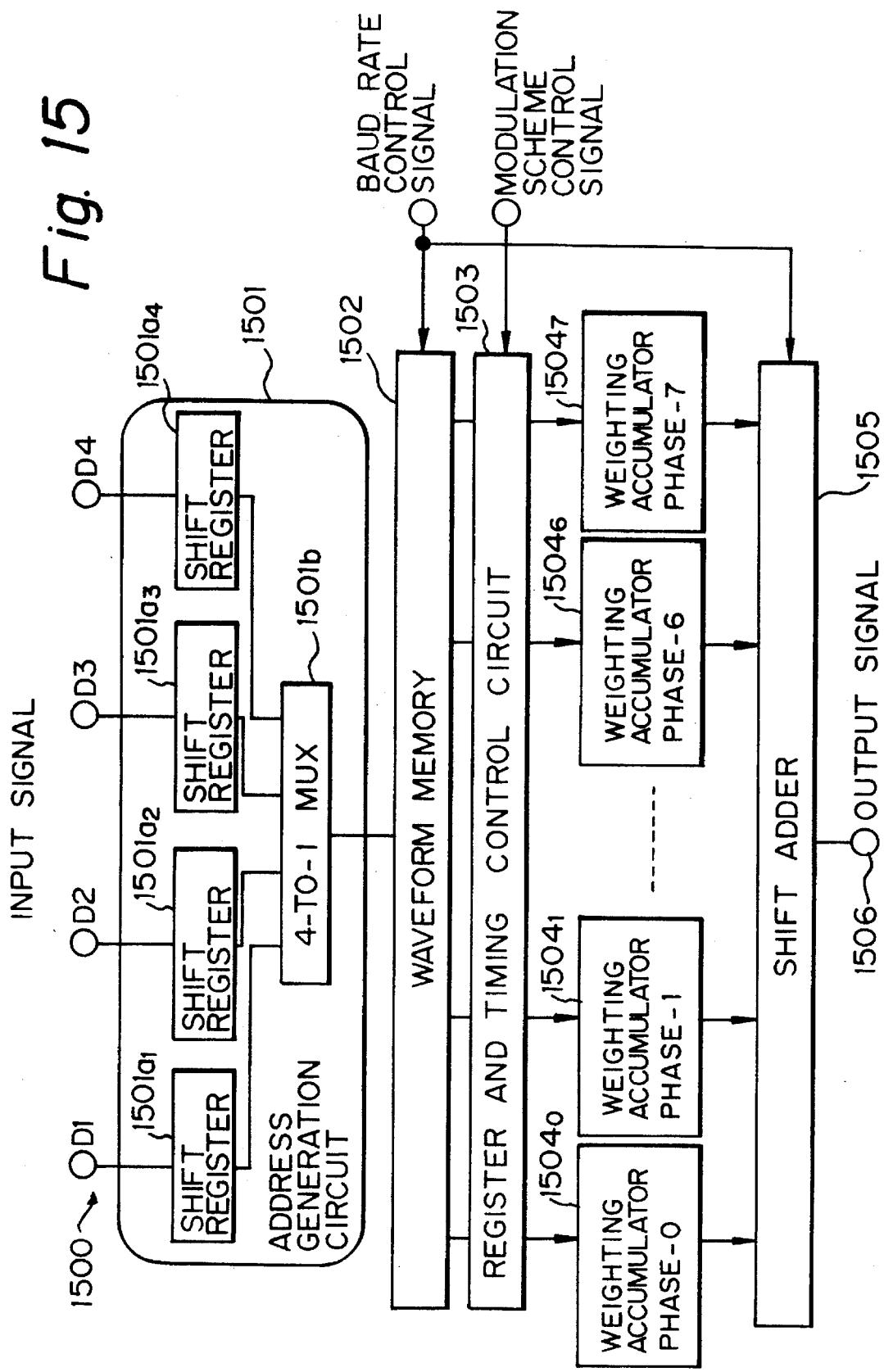
FIG. 15 shows a constitution of a digital filter in the embodiment of FIG. 13 or FIG. 14.

FIG. 15 is a block diagram showing a constitution of one channel part of the digital filter 1404 according to the embodiment of FIG. 14, of the I-channel digital filter portion 1304a according to the embodiment of FIG. 13, or of the Q-channel digital filter portion 1304b according to the embodiment of FIG. 13.

In FIG. 15, reference numeral 1501 denotes an address generation circuit for multiplexing input signals (D1, D2, D3, D4) applied thereto via four input terminals 1500. This circuit 1501 is constituted by four shift registers $1501a_1$ to $1501a_4$ for delaying the respective input signals and a four input multiplexer (4-to-1 selector) 1501b for multiplexing output signals from these shift registers.

An output terminal of the circuit 1501 is connected to an address input terminal of an waveform memory 1502. To this memory 1502, a baud rate control signal will be applied via the input terminal 1415 (FIG. 14). Output terminals of this memory 1502 is connected to input terminals of a register and timing control circuit 1503, respectively. To this circuit 1503, a modulation scheme control signal will be applied via the input terminal 1416 (FIG. 14).

Output terminals of the circuit 1503 are connected to input terminals of weighting accumulators $1504_0$ to $1504_7$ for the respective phases Phase-0 to Phase-7, respectively. Output terminals of these accumulators $1504_0$ to $1504_7$ are connected to input terminals of a shift adder 1505. An output terminal of the shift adder 1505 is connected to the quadrature modulation circuit 1305 or 1405 in FIG. 13 or 14.

Figure 16:
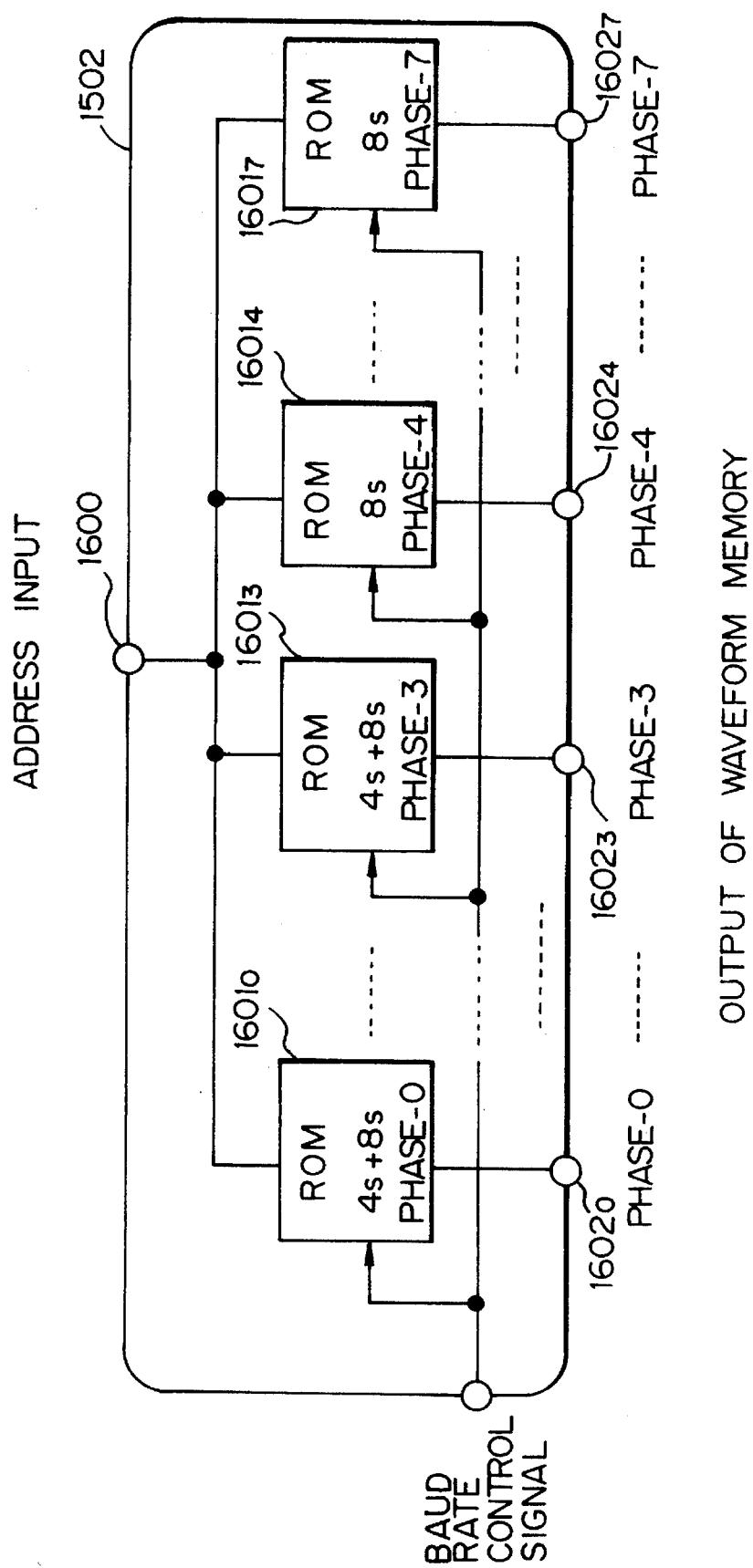
FIG. 16 shows a constitution of a waveform memory in the digital filter of FIG. 15.

FIG. 16 is a block diagram of a constitution of the waveform memory 1502 shown in FIG. 15. As will be apparent from this figure, the waveform memory 1502 is constituted by a plurality, for example eight in this case, of ROMs $1601_0$ to $1601_7$. The number of the ROMs is equal to the maximum tap number. These ROMs preliminarily store amplitude information with respect to respective phases (Phase-0 to Phase-7). This information can be read out In response to an address applied from the address generation circuit 1501 (FIG. 15) via an input terminal 1600. The read information will be outputted to the register and timing control circuit 1503 (FIG. 15) via output terminals $1602_0$ to $1602_7$.

In the ROMs $1601_0$ to $1601_7$, different tap coefficients are given, respectively. Namely, the amplitude information stored in the ROMS $1601_0$ to $1601_7$ are phase-shifted by $P_I$ in the I-channel to provide the impulse response $r(t+P_I)$ and also phase-shifted by $P_Q$ in the Q-channel to provide the impulse response $r(t+P_Q)$, so that the phase shift amount between both channels becomes equal to $P_I-P_Q$.

The baud rate control signal is applied to enable terminals of the ROMs $1601_0$ to $1601_7$ so that a certain number, which corresponds to the number of samples per symbol designated by the baud rate control signal, of the ROMs will be allowed to operate. For example, if $M_S=4$, only the ROMs $1601_0$ to $1601_3$ will be allowed to operate, and if $M_S=8$, all the ROMs $1601_0$ to $1601_7$ will be allowed to operate.

Figure 17:
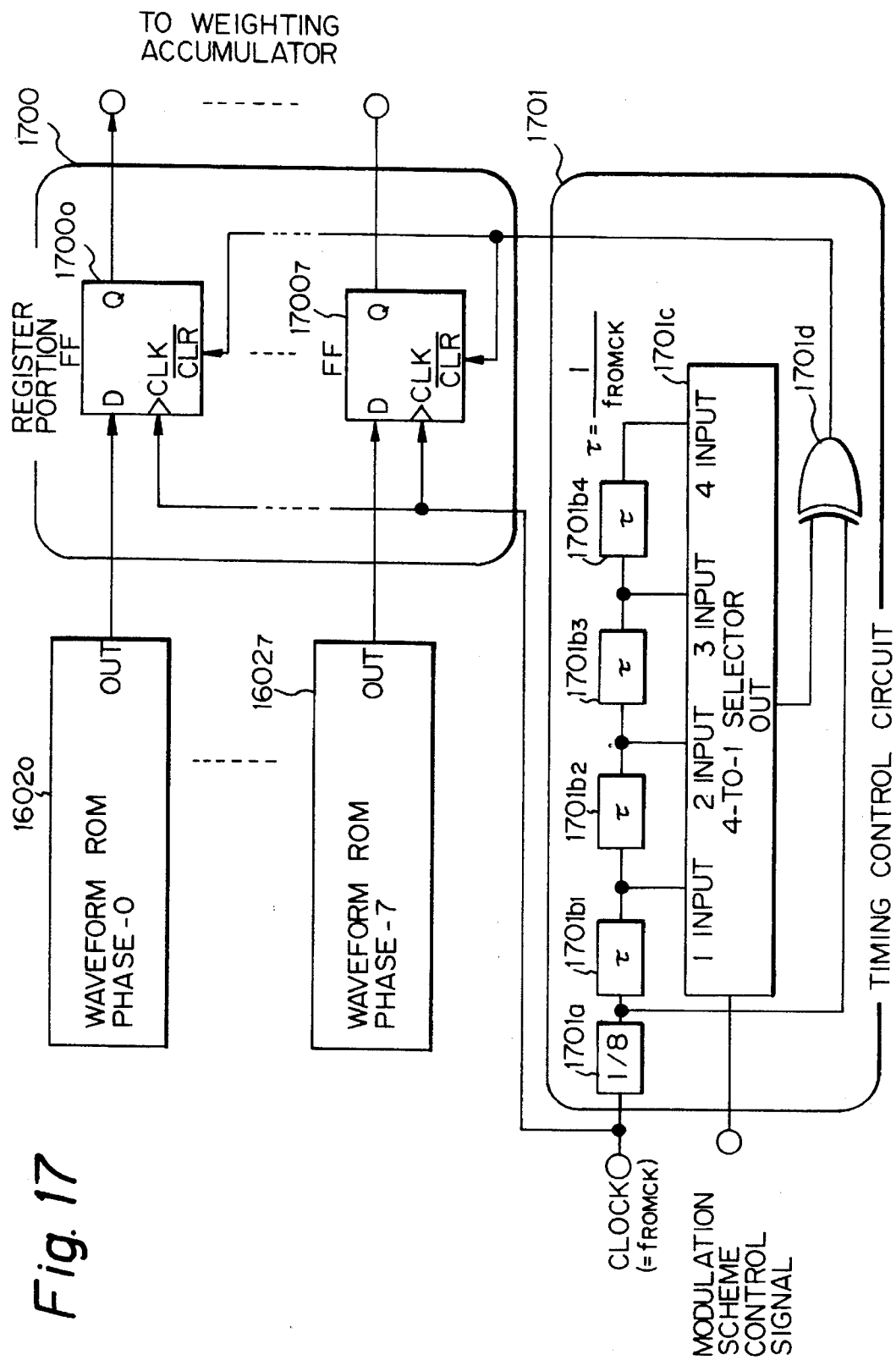
FIG. 17 shows a constitution of a register and timing control circuit in the digital filter of FIG. 15.

FIG. 17 is a block diagram of a constitution of the register and timing control circuit 1503 shown in FIG. 15. This circuit 1503 is constituted by a register portion 1700 and a timing control circuit 1701. The register portion 1700 has flip-flops $1700_0$ to $1700_7$ for the respective phases. To D-input terminals of these flip-flops, outputs from the ROMs $1601_0$ to $1601_7$ are applied, respectively. Q-output terminals of the flip-flops are connected to the input terminals of the weighting accumulators $1504_0$ to $1504_7$ shown in FIG. 15, respectively.

The timing control circuit 1701 has a frequency divider 1701a for dividing a clock frequency which is equal to the operation frequency $f_{ROMCK}$ in the waveform ROMs to ⅛ frequency, delay circuits $1701b_1$ to $1701b_4$ for delaying the frequency divided clock by $\tau=1 / f_{ROMCK}$ each, a 4-to-1 selector 1701c receiving outputs from the delay circuits $1701b_1$ to $1701b_4$, and an EXCLUSIVE OR gate 1701d receiving outputs from the selector 1701c and the divider 1701a and outputting a clear signal to the flip-flops $1700_0$ to $1700_7$. To the selector 1701c, the modulation scheme control signal is applied.

Figure 18:
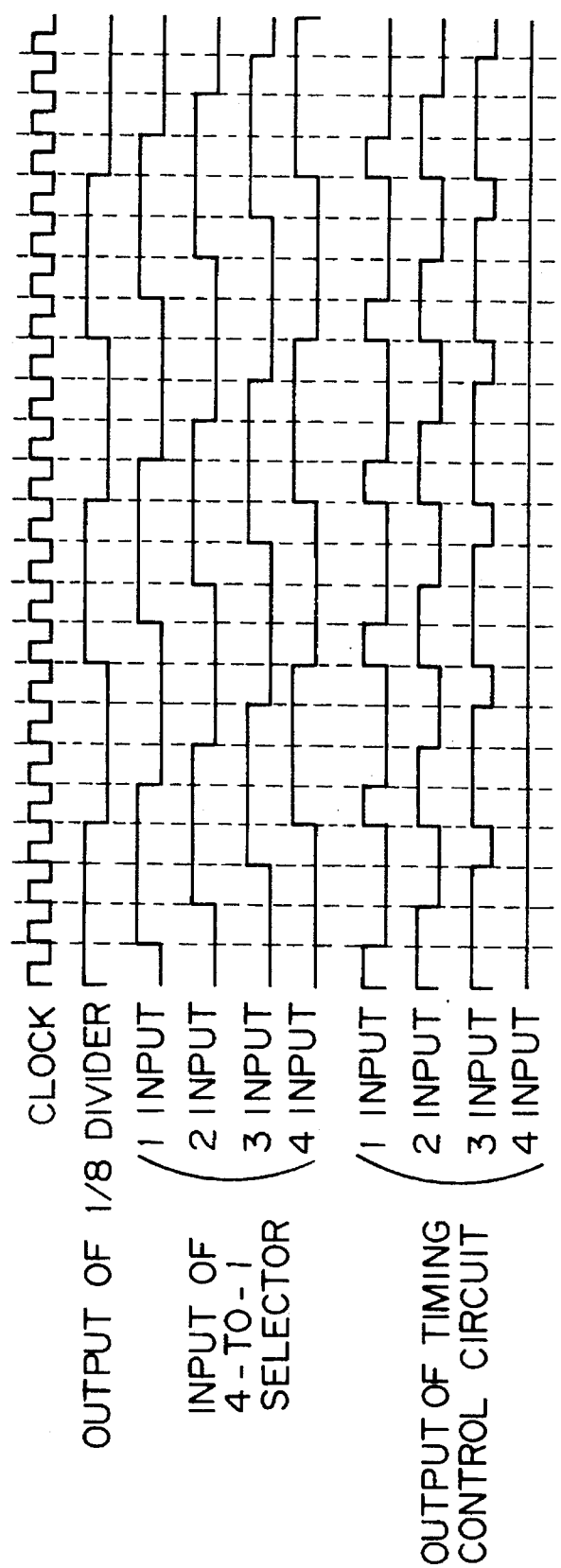
FIG. 18 illustrates a timing chart of signal processing in the register and timing control circuit of FIG. 17.

FIG. 18 illustrates a timing chart of this timing control circuit 1701. As will be apparent from this figure, the clock having the operation frequency $f_{ROMCK}$ is frequency-divided to $f_{ROMCK}/8$ by the divider 1701a, and delayed respectively by its original cycle (1 / $f_{ROMCK}$) at the delay circuits. These delayed clocks are applied to the 4-to-1 selector 1701c. The selection of one of four inputs in the selector 1701c is controlled by the modulation scheme control signal. For example, if "1 input" Is selected as an input of the selector, the output from the timing control circuit 1701 will be "1 input" as indicated in FIG. 18, which is the result of the EXCLUSIVE OR operation of this selected input and the output of the ⅛ divider 1701a. Contents in the flip-flops $1700_0$ to $1700_7$ in the register 1700 will be cleared when this output from the circuit 1701 is a L-level.

Figure 19:
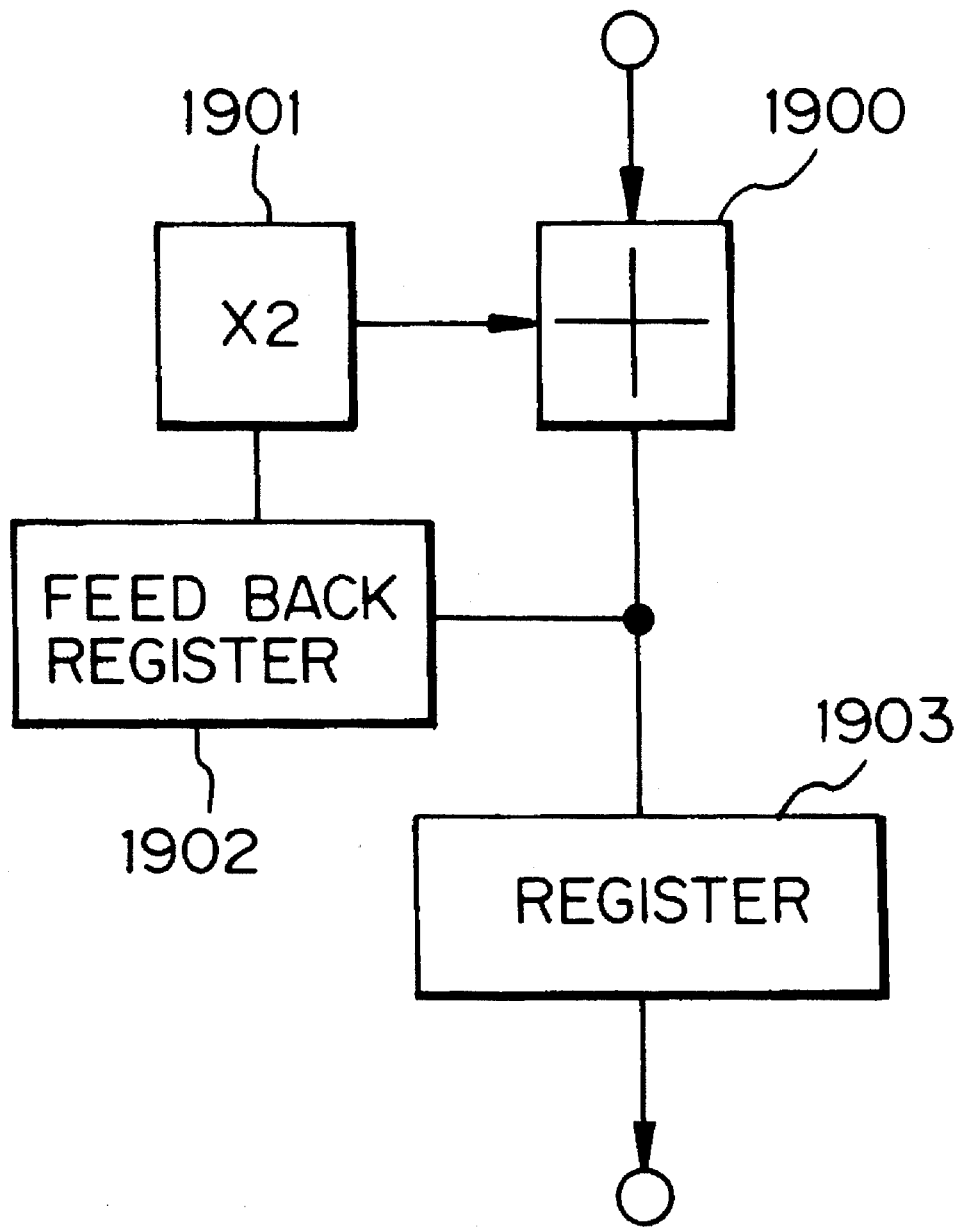
FIG. 19 shows a constitution of a weighting accumulator in the digital filter of FIG. 15.

FIG. 19 is a block diagram of a constitution of each of the weighting accumulators $1504_0$ to $1504_7$ for the respective phases (Phase-0 to Phase-7) shown in FIG. 15.

Each of the weighting accumulators is constituted by an adder 1900, a multiplier 1901 for doubling its input and for outputting the result to the adder 1900, a register 1902 with a clear signal input terminal (not shown) for feeding output from the adder 1900 back to the multiplier 1901, and a register 1903 for receiving the output from the adder 1900.

The feedback register 1902 is designed to clear its content when a certain number of accumulation operations, which is equal to the number of input signal sequence(s), is carried out. Therefore, an output of $D1+D2/2+D3/4+\ldots+Dn/2^n$ can be obtained from each of the weighting accumulators for the respective phases. Since n=4 in this example, the output of each weighting accumulator will be $D1+D2/2+D3/4+D4/8$.

Figure 20:
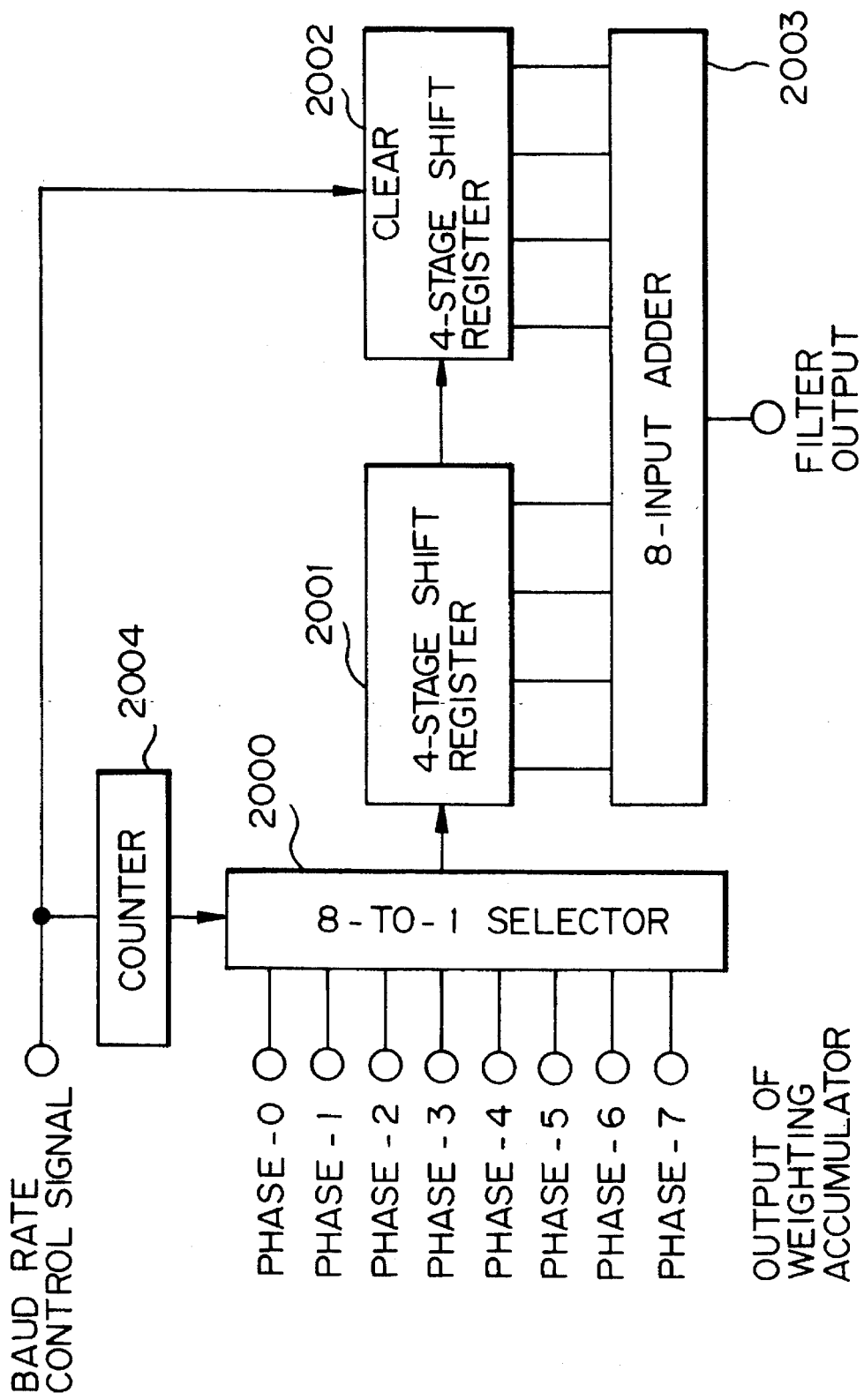
FIG. 20 shows a constitution of a shift adder in the digital filter of FIG. 15.

FIG. 20 is a block diagram of a constitution of the shift adder 1505 shown in FIG. 15.

As will be understood from this figure, the shift adder is constituted by an 8-to-1 selector 2000 for sequentially selecting outputs from the weighting accumulators $1504_0$ to $1504_7$ to output the selected signals in series, 4-stage shift registers 2001 and 2002 for delaying each of sequential outputs from the selector 2000 by a sampling cycle, an 8-input adder 2003 for adding parallel Inputs from the shift registers 2001 and 2002, and a counter 2004 for controlling a reset value of the selector 2000. The baud rate control signal is applied to this counter 2004 to change its maximum count value (reset value). For example, if the number of samples per symbol $M_S$ is $M_S=4$, the maximum count number of the counter is set so that the selector 2000 sequentially selects the accumulator outputs of Phase-0 to Phase-3. If the number of samples per symbol is $M_S=8$, the maximum count number of the counter is set so that the selector 2000 sequentially selects the accumulator outputs of Phase-0 to Phase-7. The baud rate control signal is also applied to the shift register 2002 to clear it when $M_S=4$ so that the number of input signals to the adder 2003 is controlled depending upon the number of samples per symbol.

The operation of the digital filter shown in FIG. 15 will now be described with reference to a timing chart of FIG. 21.

Input signals D1, D2, D3, D4 sampled by the clock having a cycle of $M_S$ times as long as that of the operation clock in the digital filter are delayed respectively by the shift registers $1501a_1$ to $1501a_4$ and then multiplexed by the multiplexer 1501b to produce a ROM address shown in FIG. 21.

In response to this ROM address, waveform responses (amplitude information) preliminarily stored in the ROMs $1601_0$ to $1601_7$ (FIG. 16) in the waveform memory 1502 are read out. As aforementioned, the amplitude information stored in the ROMs $1601_0$ to $1601_7$ are phase-shifted by $P_I$ in the I-channel and also phase-shifted by $P_Q$ in the Q-channel. Thus, the phase shift amount provided between both channels will be equal to $P_I-P_Q$. In this case, the ROMs of the number corresponding to the number of samples per symbol, which is designated by the baud rate control signal are enabled. Namely, only the ROMs $1601_0$ to $1601_3$ are enabled to operate when $M_S=4$, and all the ROMs $1601_0$ to $1601_7$ are enabled to operate when $M_S=8$.

Output data from the waveform memory 1502 with respect to the respective phases (Phase-0 to Phase-7) are applied to the register and timing control circuit 1503 and data in a slot or slots designated by the modulation scheme control signal are cleared to 0. For example, if "1 input" is selected depending upon the modulation scheme control signal, data in slots of D2, D3 and D4 are cleared to 0. If "2 input" is selected, data in slots of D3 and D4 are cleared to 0. If "3 input" is selected, data in a slot of D4 are cleared to 0. If "4 input" is selected, no data is cleared to 0.

Outputs from the circuit 1503 are applied to the respective weighting accumulators $1504_0$ to $1504_7$ wherein a weighting accumulation of D1+D2/2+D3/4+D4/8 is executed. Thus, amplitude information depending upon the selected one of modulation schemes QPSK to 256QAM can be provided.

In the shift adder 1505, the reset value of the counter 2004 (FIG. 20) is switched in accordance with the number corresponding to the number of samples per symbol, which is designated by the baud rate control signal so as to select desired phase outputs from the weighting accumulators $1504_0$ to $1504_7$.

As described herein before in detail, the digital filter according to this embodiment is designed to provide a phase shift of an amount which corresponds to the phase difference of $P_{dif}$ between both channels due to an absence of partial data on one channel. Thus, several cycles of carrier signals can be multiplied with an output of the digital filter without deteriorating transmission characteristics caused by the above-mentioned phase difference between the channels. Accordingly, the carrier frequency (the center frequency of the modulated output signal) can be optionally selected to a desired value without considering the operation conditions of the digital filter.

Also, since the modulation circuit is constituted by a high-speed circuit such as the complementers and the selector, it is very easy to raise the carrier frequency. If the carrier frequency is raised, folding noises (DSP noises) caused by the DSP and spurious components such as carrier leak and image caused by the frequency conversion will be produced at frequencies far from that of the modulated output signal. As a result, these DSP noise and spurious components can be sufficiently eliminated by an analog BPF having a relative wide bandpass width so as to not deteriorate transmission characteristics of the modulator. This causes the design of the analog signal processing circuit to become very easy.

Furthermore, according to this digital filter, the variable baud rate control, namely variable transmission bandwidth control is realized by forming a selection function without changing the operation condition of the digital filter. Therefore, if the analog BPF is designed to fit with the maximum baud rate mode, all the baud rate modes can be covered without changing specifications in the analog signal processing circuit.

Figure 22:
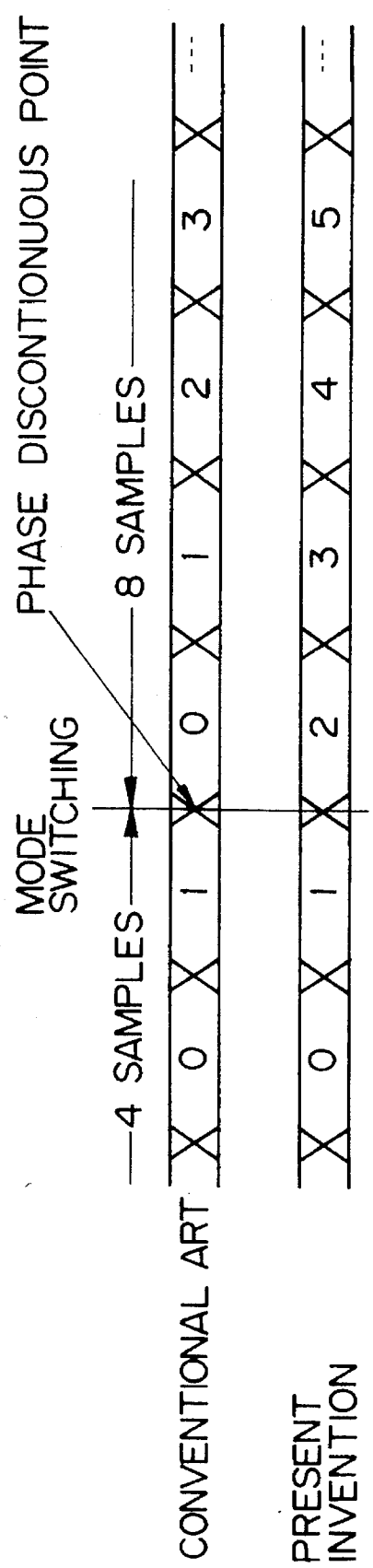
FIG. 22 illustrates continuation and discontinuation of phase at switching of the baud rate according to the conventional art and according to the present invention.

The conventional art never took account of adjusting the number of samples per symbol to variably control the baud rate. Namely, according to the conventional art, a new mode is started as soon as a switching signal for changing the baud rate is applied. Therefore, as indicated in FIG. 22, a phase discontinuity will occur at the mode switching point causing unnecessary noises to be produced. Thus, according to the conventional art, the digital filter has to be reset at the mode switching point.

Contrary to this, according to the present invention, since the baud rate mode switching is realized by the enable control of ROMs and by the control of reset value of a the counter, phase continuity can be maintained at the mode switching point. Thus, no noise will occur at the switching which results that it is not necessary to reset the digital filter at the mode switching point. Furthermore, according to the present invention, the mode switching can be completed in an instant. In FIG. 22, numerals 0, 1, 2, 3, 4 and 5 indicate phase numbers of an output of the digital filter.

Also, according to this digital filter, the variable modulation scheme control is realized by the clearing function with respect to the outputs from the waveform memory without changing the operation condition of the digital filter. Therefore, not only the mode switching of the modulation scheme can be completed in a moment, but also an advanced facility can be easily added without changing specifications in the analog signal processing circuit.

Many widely different embodiments of the present invention may be constructed without departing from the spirit and scope of the present invention. It should be understood that the present invention is not limited to the specific embodiments described in the specification, except as defined in the appended claims.

What is claimed is:

1. A digitized quadrature modulator for receiving n-sequence(s) (n is an integer equal to or greater than one) of I-channel input digital signal and n-sequence(s) of Q-channel input digital signal, and for quadrature modulating the I-channel and Q-channel input digital signals by a digital signal processing, comprising:

a digital filter for shaping a spectrum of the I-channel and Q-channel input digital signals to provide I-channel and Q-channel output signals, said output signals having a predetermined phase shift between the I-channel and the Q-channel so as to compensate a phase difference based upon the quadrature modulation by the digital signal processing;

complementary circuits for taking complement of the I-channel and Q-channel output signals to provide I-channel and Q-channel complement signals; and a multiplexer circuit for multiplexing the I-channel and Q-channel output signals from the digital filter and the I-channel and Q-channel complement signals from the complementary circuits to provide a quadrature modulated output signal.

2. A modulator as claimed in claim 1, wherein said complementary circuits consist of a first complementer for taking the complement of the I-channel output signal to provide an I-channel complement signal and a second complementer for taking the complement of the Q-channel output signal to provide a Q-channel complement signal, and wherein said multiplexer circuit consists of a selector for sequentially multiplexing the I-channel output signal, the Q-channel output signal, the I-channel complement signal, and the Q-channel complement signal in this order to provide a quadrature modulated output signal.

3. A modulator as claimed in claim 1, wherein said digital filter is constituted so that a phase of only the I-channel input digital signal or the Q-channel input digital signal is shifted by an amount of the phase difference based upon the quadrature modulation.

4. A modulator as claimed in claim 1, wherein said digital filter is constituted so that phases of the I-channel and Q-channel input digital signals are equally shifted in an opposite direction to each other by a half amount of the phase difference based upon the quadrature modulation.

5. A modulator as claimed in claim 1, wherein said digital filter is constituted so that phases of the I-channel and Q-channel input digital signals are equally shifted in an opposite direction to each other by a half amount of the phase difference based upon the quadrature modulation, and that the same filtering circuit is utilized from both directions by inverting a time base of the input digital signals.

6. A modulator as claimed in claim 1, wherein said digital filter includes a waveform memory for storing amplitude information having a predetermined phase shift between the I-channel and the Q-channel so as to compensate the phase difference based upon the quadrature modulation.

7. A modulator as claimed in claim 1, wherein said digital filter is constituted so that a number of samples per symbol $M_S$ in the digital filter is varied depending upon a baud rate control signal applied thereto.

8. A modulator as claimed in claim 7, wherein the I-channel and Q-channel input digital signals have a plurality of baud rates, and wherein said modulator is constituted so that the number of samples per symbol $M_S$ is varied depending upon the baud rates to provide modulated output signals having a same center frequency with each other.

9. A modulator as claimed in claim 7, wherein said digital filter includes a waveform memory having a plurality of ROMs for storing respective waveform data corresponding to a plurality of phases and wherein said ROMs of a number which corresponds to the number of samples per symbol $M_S$ are enabled to operate.

10. A modulator as claimed in claim 9, wherein said digital filter includes a plurality of weighting accumulators for weighting the respective waveform data from said ROMs to provide weighted data, and an adder for selecting the weighted data of a number which corresponds to the number of samples per symbol $M_S$ and for shift-adding the selected weighted data.

11. A modulator as claimed in claim 9, wherein said digital filter includes a circuit for selectively clearing the waveform data from the ROMs in response to a modulation scheme control signal applied thereto.

12. A modulator as claimed in claim 1, wherein said digital filter includes a waveform memory having a plurality of ROMs for storing respective waveform data corresponding to a plurality of phases and a circuit for selectively clearing the waveform data from the ROMs in response to the modulation scheme control signal applied thereto.

13. A modulator as claimed in claim 1, wherein said digital filter includes means for multiplexing the input digital signals to generate an address signal, a waveform memory for storing waveform data having a predetermined phase shift between the 1-channel and the Q-channel so as to compensate the phase difference caused by the quadrature modulation, and for outputting respective waveform data corresponding to a plurality of phases in response to the address signal, a plurality of weighting accumulators for weighting the respective waveform data from said memory to provide weighted data, and an adder for adding the weighted data.

* * * * *